United States Patent
Stockwell et al.

(10) Patent No.: US 6,942,784 B2
(45) Date of Patent: *Sep. 13, 2005

(54) STRUCTURALLY ENHANCED CRACKING CATALYSTS

(75) Inventors: David M. Stockwell, Westfield, NJ (US); Stephen H. Brown, Brussels (BE); Ji-Yong Ryu, League City, TX (US)

(73) Assignee: Engelhard Corporation, Iselin, NJ (US)

( * ) Notice: Subject to any disclaimer, the term of this patent is extended or adjusted under 35 U.S.C. 154(b) by 77 days.

This patent is subject to a terminal disclaimer.

(21) Appl. No.: 10/770,849

(22) Filed: Feb. 3, 2004

(65) Prior Publication Data

US 2004/0220046 A1 Nov. 4, 2004

Related U.S. Application Data

(63) Continuation-in-part of application No. 10/445,687, filed on May 27, 2003, which is a division of application No. 09/956,250, filed on Sep. 20, 2001, now Pat. No. 6,656,347, which is a continuation-in-part of application No. 09/667,677, filed on Sep. 22, 2000, now abandoned.

(51) Int. Cl.⁷ ............................................. B01J 29/06
(52) U.S. Cl. ................... 208/120.01; 208/118; 502/64; 502/65; 502/68; 502/73; 502/79
(58) Field of Search ............................. 502/64, 65, 68, 502/73, 79; 208/118, 120.01

(56) References Cited

U.S. PATENT DOCUMENTS

| | | |
|---|---|---|
| 2,656,250 A | 10/1953 | Thibon et al. |
| 2,915,475 A | 12/1959 | Bugosh |
| 3,533,962 A | 10/1970 | Cosgrove |
| 3,586,523 A | 6/1971 | Fanselow et al. |
| 3,647,718 A | 3/1972 | Haden et al. |
| 3,944,482 A | 3/1976 | Mitchell et al. |
| 4,310,441 A | 1/1982 | Alafandi et al. |
| 4,493,902 A | 1/1985 | Brown et al. |
| 4,499,197 A | 2/1985 | Seese et al. |
| 4,631,262 A | 12/1986 | Altomare |
| 4,965,233 A | 10/1990 | Speronello |
| 5,023,220 A | 6/1991 | Dight et al. |
| 5,182,243 A | 1/1993 | Brown et al. |
| 5,304,526 A | 4/1994 | Laine et al. |
| 5,306,417 A | 4/1994 | Cheng et al. |
| 5,395,809 A | 3/1995 | Madon et al. |
| 5,547,564 A | 8/1996 | Cheng et al. |
| 6,069,012 A | 5/2000 | Kayser |
| 6,165,351 A | 12/2000 | Laine et al. |
| 6,403,526 B1 | 6/2002 | Lussier et al. |
| 6,451,200 B1 | 9/2002 | Lussier et al. |
| 6,656,347 B2 * | 12/2003 | Stockwell et al. ..... 208/120.01 |
| 6,673,235 B2 * | 1/2004 | Harris et al. ........... 208/120.01 |
| 6,696,378 B2 * | 2/2004 | Gibson et al. ................. 502/79 |
| 6,716,338 B2 * | 4/2004 | Madon et al. ......... 208/120.01 |
| 2003/0089640 A1 * | 5/2003 | Madon et al. ............... 208/122 |

OTHER PUBLICATIONS

Belding, W. A. and Rigge, R.J., "Pore Volume Control in Alumina Catalyst Supports,"Nov. 21, 1983, Kaiser Aluminum & Chemical Corporation.

* cited by examiner

*Primary Examiner*—Christina Johnson
(74) *Attorney, Agent, or Firm*—Raymond F. Keller

(57) ABSTRACT

Zeolite microsphere FCC catalysts having a novel morphology comprising a porous matrix and crystallized zeolite freely coating the walls of the pores of the matrix. The catalysts are formed from microspheres containing a metakaolin and an alumina source other than kaolin having a high pore volume.

54 Claims, 5 Drawing Sheets

STRUCTURALLY ENHANCED CRACKING CATALYSTS

CROSS-REFERENCE TO RELATED APPLICATIONS

This application is a continuation-in-part of U.S. Ser. No. 10/445,687, filed May 27, 2003, which is a divisional of U.S. Ser. No. 09/956,250, filed Sep. 20, 2001, now U.S. Pat. No. 6,656,347, issued Dec. 2, 2003, which is a continuation-in-part of U.S. Ser. No. 09/667,677, filed Sep. 22, 2000 abandoned.

BACKGROUND OF THE INVENTION

The present invention relates to novel fluid catalytic cracking catalysts comprising microspheres containing Y-faujasite zeolite and having exceptionally high activity and other desirable characteristics, methods for making such catalysts and the use of such catalysts for cracking petroleum feedstocks, particularly under short residence time processes.

Since the 1960's, most commercial fluid catalytic cracking catalysts have contained zeolites as an active component. Such catalysts have taken the form of small particles, called microspheres, containing both an active zeolite component and a non-zeolite component. Frequently, the non-zeolitic component is referred to as the matrix for the zeolitic component of the catalyst. The non-zeolitic component is known to perform a number of important functions, relating to both the catalytic and physical properties of the catalyst. Oblad described those functions as follows:

"The matrix is said to act as a sink for sodium in the sieve thus adding stability to the zeolite particles in the matrix catalyst. The matrix serves the additional function of: diluting the zeolite; stabilizing it towards heat and steam and mechanical attrition; providing high porosity so that the zeolite can be used to its maximum capacity and regeneration can be made easy; and finally it provides the bulk properties that are important for heat transfer during regeneration and cracking and heat storage in large-scale catalytic cracking." A. G. Oblad Molecular Sieve Cracking Catalysts, The Oil And Gas Journal, 70, 84 (Mar. 27, 1972).

In prior art fluid catalytic cracking catalysts, the active zeolitic component is incorporated into the microspheres of the catalyst by one of two general techniques. In one technique, the zeolitic component is crystallized and then incorporated into microspheres in a separate step. In the second technique, the in-situ technique, microspheres are first formed and the zeolitic component is then crystallized in the microspheres themselves to provide microspheres containing both zeolitic and non-zeolitic components.

It has long been recognized that for a fluid catalytic cracking catalyst to be commercially successful, it must have commercially acceptable activity, selectivity, and stability characteristics. It must be sufficiently active to give economically attractive yields, it must have good selectivity towards producing products that are desired and not producing products that are not desired, and it must be sufficiently hydrothermally stable and attrition resistant to have a commercially useful life.

Two products that are particularly undesirable in commercial catalytic cracking processes are coke and hydrogen. Even small increases in the yields of these products relative to the yield of gasoline can cause significant practical problems. For example, increases in the amount of coke produced can cause undesirable increases in the heat that is generated by burning off the coke during the highly exothermic regeneration of the catalyst. Conversely, insufficient coke production can also distort the heat balance of the cracking process. In addition, in commercial refineries, expensive compressors are used to handle high volume gases, such as hydrogen. Increases in the volume of hydrogen produced, therefore, can add substantially to the capital expense of the refinery.

U.S. Pat. No. 4,493,902, the teachings of which are incorporated herein by cross-reference, discloses novel fluid cracking catalysts comprising attrition-resistant, high zeolitic content, catalytically active microspheres containing more than about 40%, preferably 50–70% by weight Y faujasite and methods for making such catalysts by crystallizing more than about 40% sodium Y zeolite in porous microspheres composed of a mixture of two different forms of chemically reactive calcined kaolin, namely, metakaolin (kaolin calcined to undergo a strong endothermic reaction associated with dehydroxylation) and kaolin calcined under conditions more severe than those used to convert kaolin to metakaolin, i.e., kaolin calcined to undergo the characteristic kaolin exothermic reaction, sometimes referred to as the spinel form of calcined kaolin. In a preferred embodiment, the microspheres containing the two forms of calcined kaolin are immersed in an alkaline sodium silicate solution, which is heated, preferably until the maximum obtainable amount of Y faujasite is crystallized in the microspheres.

In practice of the '902 technology, the porous microspheres in which the zeolite is crystallized are preferably prepared by forming an aqueous slurry of powdered raw (hydrated) kaolin ($Al_2O_3:2SiO_2:2H_2O$) and powdered calcined kaolin that has undergone the exotherm together with a minor amount of sodium silicate which acts as fluidizing agent for the slurry that is charged to a spray dryer to form microspheres and then functions to provide physical integrity to the components of the spray dried microspheres. The spray dried microspheres containing a mixture of hydrated kaolin and kaolin calcined to undergo the exotherm are then calcined under controlled conditions, less severe than those required to cause kaolin to undergo the exotherm, in order to dehydrate the hydrated kaolin portion of the microspheres and to effect its conversion into metakaolin, this resulting in microspheres containing the desired mixture of metakaolin, kaolin calcined to undergo the exotherm and sodium silicate binder. In illustrative examples of the '902 patent, about equal weights of hydrated kaolin and spinel are present in the spray dryer feed and the resulting calcined microspheres contain somewhat more kaolin that has undergone the exotherm than metakaolin. The '902 patent teaches that the calcined microspheres comprise about 30–60% by weight metakaolin and about 40–70% by weight kaolin characterized through its characteristic exotherm. A less preferred method described in the patent, involves spray drying a slurry containing a mixture of kaolin previously calcined to metakaolin condition and kaolin calcined to undergo the exotherm but without including any hydrated kaolin in the slurry, thus providing microspheres containing both metakaolin and kaolin calcined to undergo the exotherm directly, without calcining to convert hydrated kaolin to metakaolin.

In carrying out the invention described in the '902 patent, the microspheres composed of kaolin calcined to undergo the exotherm and metakaolin are reacted with a caustic enriched sodium silicate solution in the presence of a crystallization initiator (seeds) to convert silica and alumina in the microspheres into synthetic sodium faujasite (zeolite Y). The microspheres are separated from the sodium silicate mother liquor, ion-exchanged with rare earth, ammonium ions or both to form rare earth or various known stabilized forms of catalysts. The technology of the '902 patent provides means for achieving a desirable and unique combination of high zeolite content associated with high activity, good selectivity and thermal stability, as well as attrition-resistance.

The aforementioned technology has met widespread commercial success. Because of the availability of high zeolite content microspheres which are also attrition-resistant, custom designed catalysts are now available to oil refineries with specific performance goals, such as improved activity and/or selectivity without incurring costly mechanical redesigns. A significant portion of the FCC catalysts presently supplied to domestic and foreign oil refiners is based on this technology. Refineries whose FCC units are limited by the maximum tolerable regenerator temperature or by air blower capacity seek selectivity improvements resulting in reductions in coke make while the gas compressor limitations make catalysts that reduce gas make highly desirable. Seemingly a small reduction in coke can represent a significant economic benefit to the operation of an FCC unit with air blower or regenerator temperature limitations.

Improvements in cracking activity and gasoline selectivity of cracking catalysts do not necessarily go hand in hand. Thus, a cracking catalyst can have outstandingly high cracking activity, but if the activity results in a high level of conversion to coke and/or gas at the expense of gasoline the catalyst will have limited utility. Catalytic cracking activity in present day FCC catalysts is attributable to both the zeolite and non-zeolite (e.g., matrix) components. Zeolite cracking tends to be gasoline selective. Matrix cracking tends to be less gasoline selective. After appropriate ion-exchange treatments with rare earth cations, high zeolite content microspheres produced by the in situ procedure described in the '902 patent are both highly active and highly gasoline selective. As zeolite content of these unblended microspheres is increased, both activity and selectivity tend to increase. This may be explained by the decrease in matrix content with increase in zeolite content and the decreasingly prominent role of nonselective matrix cracking. Thus, increases in the zeolite content of the high zeolite content microspheres have been reported to be highly desirable.

The activity and selectivity characteristics of the catalysts formed by the process of the '902 patent are achieved even though, in general, the catalysts have relatively low total porosity as composed to fluid catalytic cracking catalysts prepared by incorporating the zeolite content into a matrix. In particular, the microspheres of such catalysts, in some cases, have a total porosity of less than about 0.15 cc/g. or even less than about 0.10 cc/g. In general, the microspheres of the '902 patent have a total porosity of less than 0.30 cc/g. As used herein, "total porosity" means the volume of pores having diameters in the range of 35–20,000 Å, as determined by the mercury porosimetry technique. The '902 patent noted that it was surprising that microspheres having a total porosity of less than about 0.15 cc/g. exhibit the activity and selectivity characteristics found. For example, such a result is contrary to the prior art disclosures that low pore volumes "can lead to selectivity losses due to diffusional restrictions."

It is believed that the relatively low porosity of the catalyst microspheres formed as in the '902 patent does not adversely effect activity and selectivity characteristics, since the microspheres of the '902 patent are not diffusion limited relative to the typical FCC processing conditions which were used at the time of the patent. In particular, catalyst contact time with the feed to be cracked was typically 5 seconds or more. Thus, while typical FCC catalysts formed by mechanically incorporating the zeolite within a matrix may have been more porous, the reaction time in prior art FCC risers did not yield any advantage in activity or selectivity. This result inspired the conclusion that transport processes were not at all limiting in FCC catalysts, at least outside the zeolite structure. Assertions made to the contrary were inconsistent with the facts and easily dismissed as self-serving. Importantly, the attrition resistance of the microspheres prepared in accordance with the '902 patent was superior to the conventional FCC catalysts in which the crystallized zeolite catalytic component was physically incorporated into the non-zeolitic matrix.

Recently, however, FCC apparatus have been developed which drastically reduce the contact time between the catalyst and the feed which is to be cracked. Conventionally, the reactor is a riser in which the catalyst and hydrocarbon feed enter at the bottom of the riser and are transported through the riser. The hot catalyst effects cracking of the hydrocarbon during the passage through the riser and upon discharge from the riser, the cracked products are separated from the catalyst. The catalyst is then delivered to a regenerator where the coke is removed, thereby cleaning the catalyst and at the same time providing the necessary heat for the catalyst in the riser reactor. The newer riser reactors operate at lower residence time and higher operating temperatures to minimize coke selectivity and delta coke. Several of the designs do not even employ a riser, further reducing contact time to below one second. Gasoline and dry gas selectivity can improve as a result of the hardware changes. These FCC unit modifications are marketed as valuable independent of the type of catalyst purchased, implying an absence of systematic problems in state of the art catalyst technology.

The processing of increasingly heavier feeds in FCC type processes and the tendency of such feeds to elevate coke production and yield undesirable products have also led to new methods of contacting the feeds with catalyst. The methods of contacting FCC catalyst for very short contact periods have been of particular interest. Thus, short contact times of less than 3 seconds in the riser, and ultra short contact times of 1 second or less have shown improvements in selectivity to gasoline while decreasing coke and dry gas production.

To compensate for the continuing decline in catalyst to oil contact time in FCC processing, the "equilibrium" catalysts in use have tended to become more active. Thus, increases in the total surface area of the catalyst need to be achieved and as well, the level of rare earth oxide promoters added to the catalysts are increasing. Moreover, cracking temperatures are rising to compensate for the reduction in conversion. Unfortunately, it has been found that the API gravity of the bottoms formed during short contact time (SCT) often increases after a unit revamp, leading some to suggest that the heaviest portion of the hydrocarbon feed takes longer to crack. Further, while a high total surface area of the catalyst is valued, the FCC process still values attrition resistance. Accordingly, while not obvious to those participating in the art, it has become increasingly likely that an optimization of FCC catalysts for the new short contact time and ultra short contact time processing which is presently being used is needed.

It is now theorized, that under the short contact time processing of hydrocarbons, that further improvements can be gained by eliminating diffusion limitations that may still exist in current catalysts. This is being concluded even as these materials excel at the application. It is theorized that improvements in these catalysts may be produced by optimization of catalyst porosity and the elimination of active site occlusion and diffusional restrictions of the binder phases present in catalysts prepared by the so-called incorporation method.

While the present assignee has produced zeolite microspheres with increased zeolite content and increased activity by increasing the macroporosity of the spray dried microsphere zeolite precursors, the porosity of the formed zeolite microsphere catalysts has not before been considered a problem since there has been found no diffusion limitation under the previous FCC processing techniques. For example, commonly assigned, U.S. Pat. No. 4,965,233, to Speronello discloses increasing the zeolite content of an in-situ catalyst by forming highly porous precursor microspheres, which allow increased amounts of zeolite to grow within the porous matrix. The highly porous precursor microspheres are formed by spray drying a slurry of hydrous kaolin, which is characterized by the presence of a major amount of large (greater than 2 microns) kaolin stacks along with spinel calcined kaolin. When spray dried, the coarse hydrous kaolin results in microspheres having a desired high content of macropores in which the zeolite Y can grow. Likewise, commonly assigned, U.S. Pat. No. 5,023,220, to Dight, et. al. also increases the macroporosity of the precursor microspheres by spray drying a mixture of hydrous kaolin, metakaolin and spinel. These catalyst microspheres have a substantial level of zeolite and are very active and selective. Further, the high alumina, silica-alumina matrix portion of the catalysts is often totally surrounded by the zeolite formed in-situ such that the matrix is only now understood to provide a reduced level of bottoms cracking under the short contact time FCC conditions.

Therefore, it is an object of the invention to provide a catalyst and a method for reproducibly preparing the same, wherein the catalyst is an attrition resistant, highly porous catalyst with a zeolite-coated matrix morphology.

It is another object of the invention to provide a catalyst optimized for short contact time FCC, particularly one that maximizes bottoms cracking.

SUMMARY OF THE INVENTION

In accordance with this invention, novel zeolite microspheres are formed which are macroporous, have sufficient levels of zeolite to be very active and are of a unique morphology to achieve effective conversion of hydrocarbons to cracked gasoline products with improved bottoms cracking under SCT FCC processing. The novel zeolite microspheres of the invention are produced by novel processing, which is a modification of technology described in U.S. Pat. No. 4,493,902. It has been found that if the non-zeolite, alumina-rich matrix of the catalyst is derived from an ultrafine hydrous kaolin source having a particulate size such that 90 wt. % of the hydrous kaolin particles are less than 2 microns, and which is pulverized and calcined through the exotherm, a macroporous zeolite microsphere can be produced. More generally, the FCC catalyst matrix useful in this invention to achieve FCC catalyst macroporosity is derived from alumina sources, such as kaolin calcined through the exotherm, that have a specified water pore volume, which distinguishes over prior art calcined kaolin used to form the catalyst matrix. The water pore volume is derived from an Incipient Slurry Point (ISP) test, which is described below.

The morphology of the microsphere catalysts which are formed is unique relative to the in-situ microsphere catalysts formed previously. Use of a pulverized, ultrafine hydrous kaolin calcined through the exotherm yields in-situ zeolite microspheres having a macroporous structure in which the macropores of the structure are essentially coated or lined with zeolite subsequent to crystallization. Macroporosity as defined herein means the catalyst has a macropore volume in the pore range of 600–20,000 Å of at least 0.07 cc/gm mercury intrusion. The catalysts of this invention should also have a BET surface area less than 500 $m^2/g$. The novel catalyst of this invention is optimal for FCC processing, including the short contact time processing in which the hydrocarbon feed is contacted with a catalyst for times of about 3 seconds or less.

In the broadest sense, the invention is not restricted to macroporous catalysts having a non-zeolite matrix derived solely from kaolin. Thus, any alumina source which has the proper combinations of porosity and reactivity during zeolite synthesis and can generate the desired catalyst macroporosity and morphology can be used. The desired morphology comprises a matrix which is well dispersed throughout the catalyst, and the macropore walls of matrix are lined with zeolite and are substantially free of binder coatings. Accordingly, not only is the large pore surface area of the catalyst vastly improved over previous catalysts, and the active matrix dispersed throughout the microsphere, the zeolite crystals are readily accessible to the hydrocarbon feed. While not wishing to be bound by any theory of operation, it appears that previous catalysts in which the zeolite is incorporated into a matrix by physical mixing and glued with binder have sufficient macroporosity, however the binder coats the active zeolite catalyst thereby blocking accessibility thereto. The present microsphere catalysts have a morphology which allows fast diffusion into the catalyst due to the macroporosity and enhanced dispersion of the matrix, and further provides the highest accessibility to the zeolite inasmuch as the zeolite is freely coated onto the walls of the pores. The term "freely" means that the zeolite phase is present on the surface of the matrix and is unobstructed by any binder phases. Merely having macroporosity does not provide the results we have obtained, since conventional incorporated catalysts have similar macroporosity. It is therefore the combination of porosity and zeolite-coated macropore walls that give the surprising selectivity results.

One would not have anticipated that contacting a heavy hydrocarbon feed, whose molecules are frequently if not generally too large to enter zeolite pores, with zeolite prior to feed contact with the matrix would be optimal, as has been found. Indeed, the prevailing "staged cracking" theory suggests the opposite, that the larger hydrocarbon molecules are first cracked on the active matrix and the formed smaller molecules subsequently cracked within the zeolite. Much research and promotional activity has been done in pursuit or support of this perceived ideal.

DETAILED DESCRIPTION OF THE INVENTION

Figure 1:
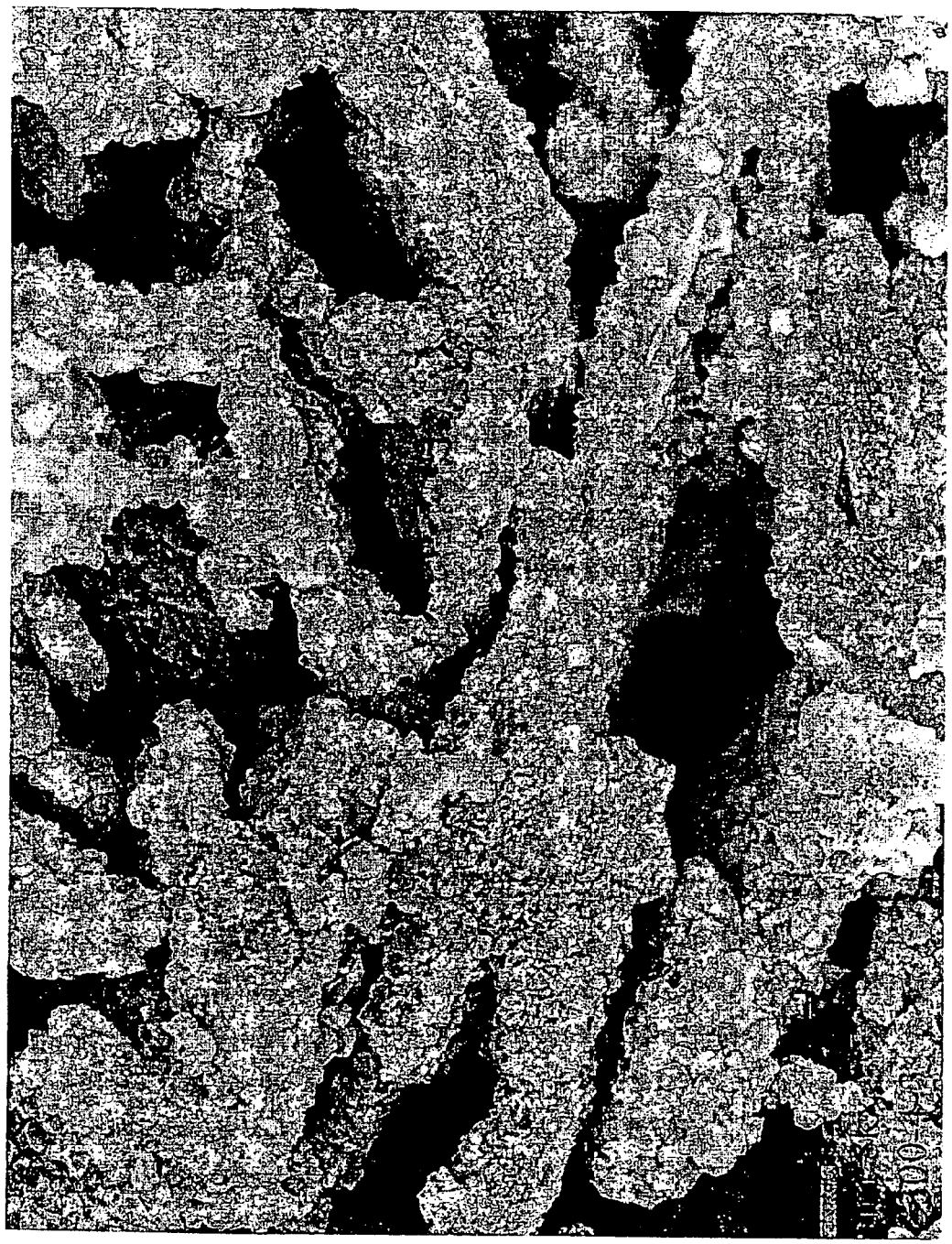
FIG. 1 is an SEM photograph of the zeolitic microsphere of this invention as prepared in Example 6.

The catalyst microspheres of this invention are produced by the general process as disclosed in commonly assigned U.S. Pat. No. 4,493,902. Importantly, the non-zeolitic, alumina-rich matrix of the catalysts of the present invention is preferably derived from a hydrous kaolin source that is in the form of an ultrafine powder in which at least 90 wt. % of the particles are less than 2.0 microns, preferably at least 90 wt. % less than 1 micron. The ultrafine hydrous kaolin is pulverized and calcined through the exotherm. Typical zeolite microspheres have been formed with an alumina-rich matrix derived from kaolin having a larger size than used in this invention and which is calcined at least substantially through its characteristic exotherm. Satintone® No. 1, (a commercially available kaolin that has been calcined through its characteristic exotherm without any substantial formation of mullite) is a material used initially on a commercial basis to form the alumina-rich matrix. Satintone® No. 1 is derived from a hydrous kaolin in which 70% of the particles are less than 2 microns. Other sources used to form the alumina-rich matrix include finely divided hydrous kaolin (e.g., ASP® 600, a commercially available hydrous kaolin described in Engelhard Technical Bulletin No. TI-1004, entitled "Aluminum Silicate Pigments" (EC-1167)) calcined at least substantially through its characteristic exotherm. Booklet kaolin has found the most widespread commercial use and has met tremendous success worldwide. Before the present invention, these larger kaolin particles represented the state of the art in forming the alumina-rich matrix of the catalyst microsphere and had no perceived deficits.

While the procedure for forming an in-situ zeolite microspheroidal catalyst as described in U.S. Pat. No. 4,493,902, is essentially followed, the alumina-rich matrix, however, is derived from an ultrafine hydrous kaolin. What is meant by "ultrafine" powder is that at least 90 wt. % of the hydrous kaolin particles must be less than 2 microns in diameter, preferably less than 1 micron determined by Sedigraph™ (or sedimentation). It has been found that, in particular, use of hydrous kaolin pigments with this particle size distribution upon pulverization and calcination through the characteristic exotherm results in a greater quantity of macroporosity even in the catalyst microsphere subsequent to zeolite crystallization. The loose packing of the calcined ultrafine kaolin, which has been found, can be likened to a "house of cards" in which the individual particulates are aligned randomly with respect to adjacent particles in a non-parallel manner. Moreover, the calcined ultrafine kaolin exists as porous aggregates of the "house of cards" morphology, providing not only a porous aggregate but additional porous areas between aggregates. Pulverization of the ultrafine hydrous kaolin is required to provide the random stacking of the individual kaolin platelets.

Kaolins or pigments are naturally-occurring hydrated aluminum silicates of the approximate formula $Al_2O_3 \cdot 2SiO_2 \cdot XH_2O$, wherein X is usually 2. Kaolinite, nacrite, dickite and halloysite are species of minerals in the kaolin group. It is well-known that when kaolin is heated in air, that a first transition occurs at about 550° C. associated with an endothermic dehydroxylation reaction. The resulting material is generally referred to as metakaolin. Metakaolin persists until the material is heated to about 975° C. and begins to undergo an exothermic reaction. This material is frequently described as kaolin, which has undergone the characteristic exothermic reaction. Some authorities refer to this material as a defect aluminum-silicon spinel or as a gamma alumina phase. See Donald W. Breck, *Zeolite Molecular Sieves*, published by John Wiley and Sons, 1974, pp. 314–315. On further heating to about 1,050° C., high temperature phases including mullite begin to form. The extent of conversion to mullite is dependent on a time-temperature relationship and the presence of mineralizers, as is well-known in the art.

In the preferred embodiments of this invention, the pulverized ultrafine hydrous kaolin used to derive the alumina-rich matrix is calcined through its characteristic exotherm with or without the formation of mullite. An especially preferred matrix source which is used in this invention to form the macroporous zeolite microspheres is Ansilex® 93. Ansilex® 93 is made from the fine size fraction of a hard kaolin crude, by spray drying, pulverizing and calcining to prepare low abrasion pigments as described in U.S. Pat. No. 3,586,523, to Fanselow, et. al., the entire contents of which are herein incorporated by reference. The ultrafine hydrous matrix source is spray dried, pulverized and then calcined through the exotherm, optionally to mullite. The aforementioned U.S. Pat. No. 4,493,902 discloses calcining the kaolin to mullite until the X-ray diffraction intensities are comparable to a fully crystalline reference standard. While it is within the scope of the present invention to calcine the kaolin beyond the exotherm such that the X-ray diffraction intensities are comparable to a fully crystalline referenced standard as disclosed in the '902 patent, it is preferred to calcine the kaolin beyond the characteristic exotherm so as to convert the kaolin to small crystallite size mullite. The small crystallite size mullite has the appropriate diffractional lines and leached chemical composition of a fully crystalline mullite standard, but the diffractional lines are weaker inasmuch as the crystallites are smaller. The relationship between diffraction intensity/line width and crystallite size is well-known. It is preferred to calcine the kaolin beyond the exotherm to a small crystallite mullite matrix inasmuch as fully calcining the kaolin to mullite takes excessive time and temperature in practice. Furthermore, calcining kaolin beyond the exotherm to fully crystalline mullite can result in the macroporosity being lost due to sintering. Moreover, the ISP and bulk density after calcining kaolin to fully crystalline mullite can be substantially increased. Thus, it is preferred that the ultrafine kaolin calcined through the exotherm has 20–80% of the integrated X-ray diffraction peak areas of a kaolin reference sample containing well crystallized mullite. More preferably, the ultrafine kaolin is calcined through the exotherm such that it has 50–70% of the integrated X-ray diffraction peak areas of fully crystallized mullite.

What is unusual about the use of the Ansilex® material is that it is derived from hard kaolin. Hard kaolins typically have a gray tinge or coloration and are, thus, also referred to as "gray clays". These hard kaolins are further characterized by breaking into irregularly shaped fragments having rough surfaces. Hard kaolins also contain a significant iron content, typically about 0.6 to 1 wt. % of $Fe_2O_3$. Hard kaolins are described in Grim's "Applied Clay Mineralogy", 1962, MaGraw Hill Book Company, pp. 394–398 thereof, the disclosure of which is incorporated by reference herein. The use of these materials to form the alumina-rich matrix for in situ FCC microsphere catalysts has not been known previous to this invention, although their use in the incorporated routes is well established. Hard kaolins have also occasionally been used as sources of metakaolin for in situ microspheres, but not with advantage. Without wishing to be bound by any theory, it would appear that previous use of the calcined gray clays in the in situ matrix art would be precluded by (a) the high iron content thereof and the possibility that this could lead to coke and gas production, and (b) the dilatant nature of slurries formed therefrom, leading to apparently senseless waste of process time and increased cost in making down high viscosity slurries which spray dry at low solids. We now believe these dilatancy problems and porosity benefits are intrinsically and fundamentally linked. As for the former point, reduced coke and gas was an especially sought-after object for in situ catalysts, since the original formulations of Haden made coke and gas commensurate with their extraordinarily high level of amorphous matrix activity. This led to lower and lower levels of iron and spinel in subsequent inventions. We have made the surprising finding that there appears to be no relationship between the iron and coke and gas selectivities after all.

The alumina-rich matrix can be derived from alumina-containing materials more generally characterized by the porosity thereof provided during the packing of the calcined material. A test has been developed to determine the pore volume of the calcined alumina-containing material which ultimately forms the matrix of the inventive catalyst. The test characterizes the water pore volume of the calcined alumina-containing material by determining the minimum amount of water needed to make a slurry from a sample of the solids. In the test, a powder sample is mixed with water containing a dispersant such as, for example, Colloid 211, Viking Industries, Atlanta, Ga., in a cup using a stirring rod or spatula. Just enough water is added to the dry sample to convert the dry powder to a single mass of dilatant mud which only just begins to flow under its own weight. The incipient slurry point (ISP) is calculated from the weights of the sample and water used. The incipient slurry point can be calculated as follows: ISP=[(grams of dry sample)/(grams of dry sample plus grams of water added)]×100. The units are dimensionless and are reported as percent solids.

This amount of water is larger than the (internal) water pore volume of the sample, but is clearly related to the water pore volume. Lower incipient slurry point percent solids values indicate higher water absorption capacities or higher pore volume in the sample. The calcined alumina-containing materials from which the high-alumina matrix is derived in accordance with this invention will have incipient slurry points less than 57% solids, preferably 48 to 52% solids. This compares with Satintone® No. 1 which yields over 58% solids in the incipient slurry point test.

Accordingly, not only is the ultrafine hydrous kaolin useful as an alumina-containing material from which to derive the matrix of the catalyst microspheres, but the matrix may also be derived from delaminated kaolin. Means for delaminating booklets or stacks of kaolin are well-known in the art. Preferred are those methods, which use a particulate grinding medium such as sand, or glass microballoons as is well-known. Subsequent to delamination, the platelets are pulverized to derive the random packing or "house of cards" morphology.

Further sources of macroporous alumina which can be used to derive the matrix of the catalyst can include, for example, non-kaolin sources such as aluminum tri-hydrates, e.g., bayerite and gibbsite, transitional aluminas, aluminum monohydrates such as boehmite and pseudoboehmite, foamed alumina, alumina-containing aerogels, hydrotalcites, silica-alumina cogels, and bauxite.

The pulverize-calcine-pulverize processing of hydrous kaolin is preferred to make the matrix precursor of the invention because it appears that, when the foregoing is used with hydrous kaolin as the metakaolin source to form the reactive precursor microspheres, superior attrition resistance results at high pore volume. While less preferred, matrix precursors may also be wet milled to further de-agglomerate the precursor. The milling appears to reduce microsphere pore volume, all other things held constant. A method to reduce microsphere pore volume is useful when pre-calcined metakaolin powder is used to form the reactive precursor microspheres. Dight has disclosed that employing metakaolin powder increases precursor microsphere pore volume, but excessive levels of zeolite and surface area can be required to make these microspheres acceptably attrition resistant. While helping to moderate the required zeolite content and also perhaps improving the dispersion of said milled matrix in the microsphere, the de-agglomeration appears to have the effect of breaking strong bonds which could have otherwise strengthened the final catalyst, and so is not preferred.

It is also within the scope of this invention to derive the matrix from chemically synthesized spinel and/or mullite. Thus, Okata, et al., "Characterization of spinel phase from $SiO_2$—$Al_2O_3$ xerogels and the formation process of mullite", Journal of the American Ceramic Society, 69 [9] 652–656 (1986), the entire contents of which are incorporated herein by reference disclose that two kinds of xerogels can be prepared by slow and rapid hydrolysis of tetraethyoxy silane and aluminum nitrate nonahydrdate dissolved in ethanol. The slow hydrolysis method involves gelling the above mixture in an oven at 60° C. for one to two weeks whereas the rapid hydrolysis method involves adding ammonium hydroxide solution to the mixture and drying in air. Xerogels prepared by the slow hydrolysis method crystallized mullite directly from the amorphous state on firing whereas the xerogels formed by rapid hydrolysis crystallized a spinel phase before mullite formation. As long as such calcined synthetic materials have a water pore volume within the scope of this invention, such materials can be used to derive the high-alumina matrix of the catalyst of this invention.

Further within the scope of this invention is to derive the matrix from other non-kaolin alumina sources. For example, alumina matrix precursors can include those derived from aluminum hydrates such as mono-hydrates and tri-hydrates and their derivatives. The tri-hydrates such as bayerite and gibbsite can crystallize in large particles with aspect ratios near 1. While aspect ratios close to 1 indicating a quasi-spherical morphology imply dense packing and low pore volume in aggregates, compensations such as proper pulverization and calcination can yield increased porosity in the aggregates. Precursors with aspect ratios well departed from 1 may well have the necessary macroporosity and thus reduce the need for secondary processing. The art has methods for yielding a platelet and acicular morphology, for example in gibbsite, and these morphologies are retained in the calcined products. For example, gibbsite can be calcined to alpha alumina. During the calcination process, a large internal porosity develops. This internal porosity is meta-stable and not maintained in the final alpha-alumina product, but the morphology of the original crystallite, and thus much of the macroporosity, may be retained in the final calcined products if sintering is not too severe. Bayerite and Si-stabilized bayerite have been used as bottoms upgrading aluminas. Accordingly, such bayerites, including bayerites calcined to eta alumina, after appropriate processing or synthesis can be produced with the desired macroporosity, and the use thereof as matrix materials in the present invention can yield the zeolite-on matrix morphology of the in-situ formed catalyst. Examples of bayerites used in incorporated catalysts are described in U.S. Pat. Nos. 6,165,351; 5,547,564; 5,306,417; and 5,304,526, the entire contents of which are herein incorporated by reference.

It is also known to flash calcine gibbsite, the product of which is highly reactive and can be rehydrated to high value boehmites. The preparation of flash calcined gibbsites typically first involves ball milling from 100 micron gibbsite. A low macropore volume in aggregates is implied due to the products having aspect ratios near 1 after ball milling. Incorporation of additives such as seed alumina, phosphates, or clays can yield porous boehmite agglomerates from the calcined gibbsite. U.S. Pat. Nos. 6,403,526 and 6,451,200 provide examples of such processing and are herein incorporated by reference in their entirety.

Alumina gels can be formed to contain both alumina mono-hydrates and alumina tri-hydrates. The gel systems include the alumina hydrates in a predominant solid phase in which the second phase can be water, a mixture of water and organic solvent, or air (aerogels). Depending on the method of preparation, the solid may be present as discrete particles ranging in size from a few nanometers to micrometers, or the solid can be in the form of three-dimensional polymeric networks, in which the domains of solid are linked to others via chemical bonds. Such three-dimensional polymeric networks can be macroporous and useful as matrix precursors in the catalyst of the present invention. The polymeric network, and in particular gels, can be prepared by controlled hydrolysis of aluminum alkoxides dissolved in organic solvents. Such gels have been used for the preparation of porous ceramic bodies. The properties of the gels prepared from aluminum alkoxides depend on temperature, ratio of water, the composition of the alkoxide, the type of solvent and stability thereof with water, presence of electrolytes, and the pH of the solution. All of these are factors which influence the final product.

The aluminum hydrates are amphoteric and, thus, are soluble in strong acid and strong bases. In aqueous solutions of intermediate pH, the solubility of these materials is very low. Due to the steep slope of the solubility curve, a small change in pH can cause considerable supersaturation and consequently rapid precipitation. Accordingly, the aluminum hydrates can be precipitated in a colloidal size which then easily coagulate to gels. Factors which determine the physical properties of the gels such as particle size, chemical composition, include temperature, rate of precipitation, final pH, ionic composition, surfactants, concentration of the starting solutions, agitation and time of aging. The rapid neutralization of aluminum salt solution with bases leads to gels rich in water, which contain variable amounts of residual acidic anions. Removal of the water and the ions may lead to macroporous components which can be useful as matrix precursors in this invention. High and low pore volume alumina monohydrates are generally known in the art. High macroporosity, at least for pseudo-boehmites, appears to be associated with processes employing precipitations from the aluminum salts. The crystallites in these materials may be fibrous. These materials are commonly employed in the extrusion of macroporous alumina supports for applications such as hydrotreating, etc. The macroporosities of these materials would be useful in the catalyst of the invention, yielding macropore structures in the ultimate catalyst. Use of milling and mulling processes for particle size and porosity control is anticipated to be an essential part and chief benefit of these specific materials. Such materials are described in U.S. Pat. Nos. 2,656,250 and 2,915,475, the entire contents of which are herein incorporated by reference.

There is an enormous art describing Si—Al cogels for FCC and other applications. This art is not practiced anymore, since the products provided high pore volume, low density FCC (gel catalysts) which had comparatively poor attrition resistance. In-situ and sol-bound catalysts demonstrated much better attrition resistance, and thus, these cogels were replaced by colloidal binder technology with improved results. However, the same properties that made the prior art cogels poor for FCC render such materials excellent as in-situ precursors of the matrix and FCC catalysts of this invention. Upon calcination, the alumina-rich portions of the gel are likely to form Si-free transition aluminas, Si—Al spinel or Si-modified transition aluminas, alpha alumina, and/or mullite. The silica-rich regions are likely to form high surface area amorphous silica-alumina. The former is anticipated to be functionally equivalent to a kaolin-based active matrix, and the latter to be excellent quality nutrient for zeolite growth. Non-limiting examples of forming cogels are described in U.S. Pat. Nos. 4,310,441 and 4,499,197, the entire contents of which are herein incorporated by reference.

Large pore volume matrices can also be formed from foamed alumina and porous bauxite.

The process of hydrothermal gel aging and/or rehydration, either at ambient pressure or under autoclave or elevated pressure conditions, can be used to interconvert between the aluminum hydroxide precursor phases recited above.

Preferably, the pore volume of the crystallized zeolitic microsphere of this invention, which is formed using the macroporous alumina-containing materials to form the catalyst matrix, is greater than 0.27 cc/gm, preferably greater than 0.30 cc/gm of Hg in the range of 40–20,000 Å diameter. More particularly, the catalyst of this invention has a macropore volume within pores having a size range of 600 to 20,000 Å of at least 0.07 cc/gm of Hg, and preferably at least 0.10 cc/gm of Hg. While conventional zeolite-incorporated catalysts have macroporosities comparable to the catalysts of this invention, the incorporated catalysts do not have the novel zeolite-on-matrix morphology nor performance of the catalysts of this invention. The catalysts of this invention will have a BET surface area less than 500 $m^2/g$, preferably less than 475 $m^2/g$ and most preferably within a range of about 300–450 $m^2/g$. The moderate surface area of the catalysts of this invention in combination with the macroporosity achieves the desired activity and selectivities to gasoline while reducing gas and coke yields.

It has further been found that the macroporosity of the catalyst of this invention can be maintained even if a portion of the matrix is derived from coarse alumina-containing materials which otherwise do not meet the water pore volume desired by this invention as determined by the ISP test. Thus, it was found that blends of booklet kaolin and ultrafine kaolins that are calcined through the exotherm produce catalysts with high pore volume, wide macropores but with a lower zeolite content. Such catalysts can be valuable for exceptionally severe cracking environments.

While it is preferred that the catalysts of this invention contain a desired portion of macroporosity, it has been found that useful catalysts having total mercury pore volume of greater than 0.27 cc/gm can be formed from the porous kaolin materials described above in which the catalysts have minimal if any macropore volume. In such a catalyst, the pore volume is provided primarily by pores having a diameter typically between 100–600 Å, i.e. mesopore volume. It has been found that catalysts formed from the highly porous kaolin matrix precursors will yield the zeolite-on-matrix morphology even though the pore volume is achieved primarily in the form of mesoporosity.

Still further, a catalyst of this invention having the zeolite-on-matrix morphology can be achieved by the non-kaolin alumina sources described above with crystallized zeolitic microsphere total pore volume of greater than 0.20 cc/gm of Hg for pores in the range of 40–20,000 Å. It is preferred that the total mercury pore volume be greater than 0.27 cc/gm.

The general procedure for manufacturing the FCC microspheres of this invention is well-known in the art and can be followed from the procedure disclosed in U.S. Pat. No. 4,493,902. As disclosed therein, an aqueous slurry of reactive finely divided hydrous kaolin and/or metakaolin and alumina-containing material which forms the matrix such as the ultrafine kaolin that has been calcined through its characteristic exotherm is prepared. The aqueous slurry is then spray dried to obtain microspheres comprising a mixture of hydrous kaolin and/or metakaolin and kaolin that has been calcined at least substantially through its characteristic exotherm to form the high-alumina matrix. Preferably, a moderate amount of sodium silicate is added to the aqueous slurry before it is spray dried. During and after spray drying the sodium silicate functions as a binder between the kaolin particles.

The reactive kaolin of the slurry to form the microspheres can be formed of hydrated kaolin or calcined hydrous kaolin (metakaolin) or mixtures thereof. The hydrous kaolin of the feed slurry can suitably be either one or a mixture of ASP® 600 or ASP® 400 kaolin, derived from coarse white kaolin crudes. Finer particle size hydrous kaolins can also be used, including those derived from gray clay deposits, such as LHT pigment. Purified water-processed kaolins from Middle Georgia have been used with success. Calcined products of these hydrous kaolins can be used as the metakaolin component of the feed slurry. The higher pore volume obtained using metakaolin can be offset by wet milling the matrix precursor. Silicate for the binder is preferably provided by sodium silicates with $SiO_2$ to $Na_2O$ ratios of from 1.5 to 3.5 and especially preferred ratios of from 2.88 to 3.22.

A quantity (e.g., 3 to 30% by weight of the kaolin) of zeolite initiator may also be added to the aqueous slurry before it is spray dried. As used herein, the term "zeolite initiator" shall include any material containing silica and alumina that either allows a zeolite crystallization process that would not occur in the absence of the initiator or shortens significantly the zeolite crystallization process that would occur in the absence of the initiator. Such materials are also known as "zeolite seeds". The zeolite initiator may or may not exhibit detectable crystallinity by x-ray diffraction.

Adding zeolite initiator to the aqueous slurry of kaolin before it is spray dried into microspheres is referred to herein as "internal seeding". Alternatively, zeolite initiator may be mixed with the kaolin microspheres after they are formed and before the commencement of the crystallization process, a technique which is referred to herein as "external seeding".

The zeolite initiator used in the present invention may be provided from a number of sources. For example, the zeolite initiator may comprise recycled fines produced during the crystallization process itself. Other zeolite initiators that may be used include fines produced during the crystallization process of another zeolite product or an amorphous zeolite initiator in a sodium silicate solution. As used herein, "amorphous zeolite initiator" shall mean a zeolite initiator that exhibits no detectable crystallinity by x-ray diffraction.

The seeds may be prepared as disclosed by in U.S. Pat. No. 4,493,902. Especially preferred seeds are disclosed in U.S. Pat. No. 4,631,262.

After spray drying, the microspheres may be calcined directly, or alternatively acid-neutralized to further enhance ion exchange of the catalysts after crystallization. The acid-neutralization process comprises co-feeding uncalcined, spray dried microspheres and mineral acid to a stirred slurry at controlled pH. The rates of addition of solids and acid are adjusted to maintain a pH of about 2 to 7, most preferably in the case where the microspheres are derived solely form kaolins, from about 2.5 to 4.5 with a target of about 3 pH. When alternative alumina sources are used as precursors for the active matrix, the pH ranges used should be compatible with these materials as is well known. Gibbsite-containing microspheres, for example, should be neutralized at pH of about 5–7. The sodium silicate binder is gelled to silica and a soluble sodium salt, which is subseqently filtered and washed free from the microspheres. This removal of sodium is particularly critical in the case of using non-kaolin alumina sources, since sodium is otherwise easily trapped as undesirable sodium aluminiais. The silica gel-bound microspheres are then calcined. In either case, calcination is done at a temperature and for a time (e.g., for two hours in a muffle furnace at a chamber temperature of about 1,350° F.) sufficient to convert any hydrated kaolin component of the microspheres to metakaolin, leaving the previously calcined kaolin components of the microspheres essentially unchanged. Hydrated non-kaolin alumina sources are also converted to transition alumina phases during this processing. The resulting calcined porous microspheres comprise a mixture of metakaolin and kaolincalcined through its characteristic exotherm in which the two types of calcined kaolin are present in the same microspheres. Alternatively any appropriate calcined alumina can replace the kaolin calcined through the exotherm as previously described. In general, the weight ratio of metakaolin to calcined alumina should be about 1:0.66 to 1:4, preferably 1:1.5 to 1:3. Thus, calcined the microspheres should generally comprise about 25–60% by weight metakaolin and about 40–75% by weight of a calcined alumina source such as kaolin that has been calcined through its characteristic exotherm or the alternative non-kaolin alumina source. Preferably 30–40% by weight metakaolin and 60–70% by weight calcined alumina are provided. Also present may be $Na_2O$ and $SiO_2$ derived from sodium silicate binder.

Y-faujasite is allowed to crystallize by mixing the calcined kaolin microspheres with the appropriate amounts of other constituents (including at least sodium silicate and water), as discussed in detail below, and then heating the resulting slurry to a temperature and for a time (e.g., to 200°–215° F. for 10–24 hours) sufficient to crystallize Y-faujasite in the microspheres. The prescriptions of U.S. Pat. No. 4,493,902 may be followed as written. Equivalent, reformatted recipes are provided as follows, however.

The crystallization recipes we employ are based on a set of assumptions and certain raw materials. The seeds are described by U.S. Pat. No. 4,631,262 and are preferably used externally. The SiO2, Al2O3, and Na2O components of metakaolin, seeds, sodium silicate solution, calcined sodium silicate binder, and silica gel are assumed to be 100% reactive. The alumina and silica in kaolin calcined through the exotherm to the spinel form are assumed to be 1% and 90% reactive respectively. Although these two values are in use, they are not believed to be accurate. The alumina and silica in kaolin calcined through the exotherm to the mullite form are assumed to be 0% and 67% reactive, respectively. These two values are believed to be accurate, representing the inertness of 3:2 mullite in crystallization and the full solubility of the free silica phase. Similarly, $\alpha\text{-}Al_2O_3$ is believed to be non-reactive for zeolite synthesis. Transition aluminas on the other hand have been found to have as much as 25% of the alumina reactive for zeolite growth however. Since metakaolin alumina is the limiting reagent in the synthesis and the volume of zeolite is much larger than the corresponding volume of metakaolin, it is important to limit the zeolite yield appropriately for a given microsphere pore volume. Otherwise, there will result little or no residual pore volume after crystallization. Such is the case for the prior art. On the other hand, if insufficient limiting reagent is available in the microsphere to grow sufficient zeolite to appropriately strengthen the catalyst, additional nutrient alumina may be added in the form of metakaolin microspheres, as is well known in this art. Thus, tight process control is enabled for pore volume and attrition.

Once again, it is essential that the amount of aluminum nutrient provided in the faujasite crystallization be limited such that a limited and controlled amount of zeolite Y is formed. Because zeolite Y has a void fraction of about 0.5 and has a higher Si/Al ratio than kaolin, the zeolite grown from metakaolin occupies much more volume than the starting metakaolin. Controlling zeolite yield ensures that there will be residual macroporosity in the finished catalyst. As in our parent case, one needs to calculate the crystallization stoichiometric ratios based on a knowledge of the fraction of reactive alumina present in each of the crystallization components. In this work, one is tempted to assume that transition aluminas have no aluminum reactive for the growth of zeolite Y. In the case of gibbsite-derived alumina however, as much as 25% of the aluminum has been found reactive for zeolite growth. Since additional nutrient alumina will lead to more synthesized zeolite (Si is always present in excess) and lower finished catalyst pore volume, it is essential to measure and account for this factor in the synthesis. In principle, the fraction active may vary from alumina to alumina. There is at present no way to predict this property, and not all cases can by anticipated by us. One determines the fraction active experimentally, by formulation of the relevant microspheres with very high pore volume, as disclosed herein, and then crystallizing these microspheres under a series of hypothetical fractions of reactive alumina. The fractions active for $\alpha$-$Al_2O_3$ and kaolin-based ingredients are disclosed above. The experimental data for optimally crystallized ZSA is then compared to that predicted by the material balances based on these same hypotheses. The hypothesis most able to predict the actual zeolite content, determined by comparison or interpolation, is the correct one and this should be used in any further work. This allows the user to predict and control the properties of the FCC catalysts of the invention.

Using these assumptions, the following weight ratios for reactive components are used in the overall crystallization recipes. Inert components do not enter into the ratios, except in the case of the seeds dose, which is defined as the ratio of the grams of seeds $Al_2O_3$ to total grams of microspheres.

| Weight Ratios | | | | |
|---|---|---|---|---|
| | $SiO_2/Na_2O$ | $SiO_2/Al_2O_3$ | $H_2O/Na_2O$ | Seeds $Al_2O_3$/MS |
| Broadly | 2.50–3.1 | 4.5–15 | 5–15 | .01–0.0001 |
| Preferred | 2.55–2.95 | 5.5–8 | 5.5–8 | 0.006–0.001 |
| Typical | | 7.0 | 7.0 | 0.004 |
| (mullite) | 2.575 | | | |
| (spinel) | 2.75 | | | |
| (Acid-neutr) | 2.9 | | | |

The sodium silicate and sodium hydroxide reactants may be added to the crystallization reactor from a variety of sources. For example, the reactants may be provided as an aqueous mixture of N® Brand sodium silicate and sodium hydroxide. As another example, at least part of the sodium silicate may be provided by the mother liquor produced during the crystallization of another zeolite-containing product.

After the crystallization process is terminated, the microspheres containing Y-faujasite are separated from at least a substantial portion of their mother liquor, e.g., by filtration. It may be desirable to wash to microspheres by contacting them with water either during or after the filtration step. The purpose of the washing step is to remove mother liquor that would otherwise be left entrained within the microspheres.

"Silica Retention" may be practiced. The teachings of U.S. Pat. No. 4,493,902 at column 12, lines 3–31, regarding silica retention are incorporated herein by cross-reference.

The microspheres that are filtered contain Y-faujasite zeolite in the sodium form. Typically, the microspheres contain more than about 8% by weight $Na_2O$. To prepare the microspheres of the present invention, a substantial portion of the sodium ions in the microspheres are replaced by ammonium or rare earth ions or both.

Ion exchange may be conducted by a number of different ion exchange methods. Preferably, the microspheres are first exchanged one or more times with an ammonium nitrate solution at a pH of about 3–4. The ion exchange(s) with ammonium ions are preferably followed by one or more ion exchanges with rare earth ions at a pH of about 3–4. The rare earth may be provided as a single rare earth material or as a mixture of rare earth materials. Preferably, the rare earth is provided in the form of nitrates or chlorides. The preferred microspheres of the invention are ion exchanged to contain between 0% and 12% by weight REO, most preferably 0.5% to 8% by weight REO and less than about 0.5%, more preferably less than about 0.4%, and most preferably about 0.2% by weight $Na_2O$. As is well known, an intermediate calcination will be required to reach these soda levels.

After ion exchange is completed, the microspheres are filtered and dried. The procedure described above for ion exchanging the FCC microsphere catalysts of this invention is well-known and, as such, such process, per se, does not form the basis of this invention.

The microspheres of the invention may be marketed either in a pure form or blended with other catalysts, additives and/or other blending agents.

The catalyst of the present invention, like all commercial fluid catalytic cracking catalysts, will be hydrothermally deactivated during the operation of the cracking unit. Accordingly, as used herein, the phrase "cracking the petroleum feedstock in the presence of a catalyst" shall include cracking the petroleum feedstock in the presence of the catalyst in its fresh, partially deactivated, or fully deactivated form.

The preferred catalyst of the invention comprises microspheres containing at least 40% and preferably from 50% to 65% by weight Y-faujasite, expressed on the basis of the as-crystallized sodium faujasite form of zeolite. As used herein, the term Y-faujasite shall include synthetic faujasite zeolites exhibiting, in the sodium form, an X-ray diffraction pattern of the type described in Breck, Zeolite Molecular Sieves, p. 369, Table 4.90 (1974), and having a crystalline unit cell size, in the sodium form (after washing any crystallization mother liquor from the zeolite), of less than about 24.75 Å as determined by the technique described in the ASTM standard method of testing titled "Determination of the Unit Cell Size Dimension of a Faujasite Type Zeolite" (Designation D3942-80) or by an equivalent technique. The term Y-faujasite shall encompass the zeolite in its sodium form as well as in the known modified forms, including, e.g., rare earth and ammonium exchanged forms and stabilized forms. The percentage of Y-faujasite zeolite in the microspheres of the catalyst is determined when the zeolite is in the sodium form (after it has been washed to remove any crystallization mother liquor contained within the microspheres) by the technique described in ASTM standard method of testing titled "Relative Zeolite Diffraction Intensities" (Designation D3906-80) or by an equivalent technique. It is important to equilibrate the microspheres carefully before X-ray evaluations are made since equilibration can have a significant effect on the results.

FIG. 1 illustrates the unique morphology of the FCC catalysts of this invention achievable from a unique alumina-containing material used to derive the catalyst matrix not previously used or even thought useful in the prior art of in-situ zeolite catalyst formation. Again, from the discussion above, it was thought that the less porous catalyst microspheres were superior products in view of the excellent attrition resistance, high activity and selectivity provided, especially in light of the well established fact that these catalysts have selectivity at least equivalent to lower surface area, higher pore volume catalysts, and frequently better selectivity at short contact time. Assertions to the contrary would easily be dismissed as self-serving and would also be tantamount to saying the so-called incorporated catalysts were diffusion-limited at short residence time. It has only recently been discovered that under the short contact time FCC processing, FCC catalysts technologies may be diffusion limited with respect to transport in pores external to the zeolite. This is proposed to be the reason that the API gravity of the bottoms fraction has often risen after SCT revamp. Less obvious than that, it now appears that conventional, prior art catalysts fail to provide all of the potential gains of the SCT hardware. But heretofore there was no way to know what benefits were absent. Accordingly, the catalyst microspheres of this invention have a substantially different morphology than the previous catalyst microspheres, especially with respect to the increased pore volume, zeolite-on-matrix morphology, and moderate surface area. Attrition resistance of these catalyst is good and effective for the SCT FCC processing conditions.

As can be seen from FIG. 1, the catalyst of this invention includes a macroporous matrix in which the macropores of the matrix are formed from a random configuration of porous matrix planar structures which are lined on the opposing surfaces of the planes with the zeolite crystals. Thus, the macropores of the catalyst are lined with the active zeolite crystals. In FIG. 1, the mesoporous matrix planes are formed from mullite particles.

The macroporosity of the catalyst allows the hydrocarbons to enter the catalyst freely and the increased macropore surface area thereof allows such hydrocarbons to contact the catalytic surfaces. Importantly, the hydrocarbons can contact the zeolite unobstructed, rendering the catalyst very active and selective to gasoline. While conventional incorporated zeolite catalysts, in which the zeolite crystals are incorporated within a binder and/or matrix, have a highly porous matrix, at least a portion of the binder coats or otherwise obstructs the zeolite crystals. In the present microspheroidal catalysts, there is no need for a separate physical binder which glues the zeolite to the matrix surface other than any minute amounts of silicate which may remain subsequent to zeolite crystallization. It is believed that the microsphere catalysts formed in accordance with the process of the present invention yield the highest accessibility to the zeolite of any zeolite/matrix catalyst.

It has been found that the microspheroidal catalysts of the present invention provide high conversions via low coke selectivity and higher selectivities to gasoline relative to previous FCC catalysts presently on the market. It is surprising that this catalyst can consistently outperform conventional incorporated catalysts of similar or even higher porosity and lower surface area. This shows that having added porosity alone is not sufficient. It is now believed that the novel structured catalysts, being both macroporous and with the macropore walls lined with zeolite and with the mesoporous or microporous matrix substantially behind the zeolite layer are the reasons the catalyst excels at gasoline, LCO and coke selectivity. The present catalyst is sufficient to crack the heavier hydrocarbons and improve the API gravity of the bottom fraction, especially during the short contact time processing. Prior to this invention, it was conventionally thought and routinely asserted that the best results for bottoms cracking in short contact time would be obtained by a "staged cracking" mechanism, wherein heavy feed components were forced to contact a meso- or microporous matrix such as alumina derived from peptized pseudoboehmite which covered or coated the zeolite. Our results show, surprisingly, that precisely the opposite is true.

The examples which follow illustrate the present invention:

EXAMPLE 1

A microsphere was prepared containing 30 parts of metakaolin (MK), 20 parts of wet media-milled Ansilex 93™, 20 parts of media-milled HiOpaque™ pigment calcined beyond 1,050° C., and 30 parts of NuSurf™ pigment which had been directly calcined beyond 1,050° C., pulverized and fluid-energy milled. To this mixture of calcined kaolins was added 15 parts of SiO2 added from N-brand® sodium silicate. This microsphere was not acid-neutralized. The metakaolin source was Metamax™, a pulverized powder, made down at 55% solids in tap water with 3 ml Colloid 211 surfactant (Viking Industries, Atlanta, Ga.) per kg of calcined kaolin. An air-driven Cowles mixer was used in a batch process where the dry kaolin was added to the water that already contained the surfactant. The kaolin was added more slowly to the water as the mixture thickened. A very dilatant slurry was formed but continued mixing reduced the viscosity. Gradual addition of the kaolin and continued mixing during 45 minutes or more led to a slurry for which the dilatancy was no longer apparent by casual inspection.

The media-milled Ansilex 93™ pigment was derived from a mixture of commercially produced slurries of 50% and 60% solids content. About 7 gallons of these slurries was placed in a stirred feed tank of a 4 L agitated media mill (Premier Mill Corp., Reading Pa.). Three passes through the mill at about 4 minutes residence time each gave 90% less than 1.66 um by laser scattering (Horiba) at 51% solids.

HiOpaque™ is a calcined pigment derived from delaminated kaolin. Commercially produced pigment was further calcined using cordierite trays and a pre-heated high temperature electric furnace at 2350° F. during four hours, in order to obtain the maximum yield of well-crystallized mullite. The furnace product was then crushed to form a powder, made down and wet media milled as above in four passes. The final product was 90%<3.24 um by laser scattering and at 37% solids by specific gravity. Both wet-milled slurries were very low in viscosity.

NuSurf™ is a coarse fraction of delaminated hydrous kaolin. This product was calcined at 2350° F. for four hours in cordierite trays to obtain maximal yield of well-crystallized mullite, crushed, then fluid energy milled with air (Micron Master Jet Pulverizer, Jet Pulverizer Co., Palmyra, N.Y.) to 90%<8.51 um particle size. This material was easily made down at 50% solids using tap water and 3 ml Colloid 211 per kg of dry kaolin in a Cowles mixer to form a non-dilatant slurry. The ease of the make-down suggested that the hydrous pigment was not optimally pulverized before calcination or the fluid energy milling had compressed the aggregates.

Each of the four component slurries was maintained in suspension by rolling in sealed jugs until required for blending.

The slurry for spray drying was formed by mixing the four component slurries in the 30:20:20:30 ratio on a 4 kg overall dry basis, as noted above, in a Cowles mixer. Directly to this slurry 2.14 kg of N-brand® Sodium Silicate was added to form a mixture at 45.7% solids which was sufficiently fluid to pump and spray dry. The material was spray dried using a 0.6 mm single fluid nozzle at 700 psi.

The as-sprayed material had a 0.71 gm/ml ABD (apparent bulk density) and analyzed with 3.9% $Na_2O$, or 13.1% binder as $SiO_2$. This product was calcined directly at 1500° F. in a pre-heated furnace using open cordierite trays during two hours. The product had 0.356 cc/gm pore volume in the 40–20,000 Å diameter range by mercury porosimetry, a 76 um APS and 14.2 wt. % acid-solubles (U.S. Pat. No. 5,023,220; column 18, line 59) and a 0.71 gm/cc ABD.

EXAMPLE 2

A microsphere was prepared containing 30 parts of MK, 20 parts of wet media-milled Ansilex 93™ 20 parts of ball-milled NuSurf™ pigment calcined beyond 1,050° C., and 30 parts of NuSurf™ mullite aggregates prepared by pulverizing the hydrous pigment before calcining beyond 1,050° C., plus 15 parts of $SiO_2$ added from N-brand® sodium silicate. This microsphere was acid-neutralized.

The MK source was a second batch of Metamax™ made down at 55% solids with C211 dispersant. The media-milled Ansilex 93™ was the same slurry as prepared in Example 1.

The ball-milled NuSurf™ mullite was prepared by calcining the hydrous delaminated pigment at 2350° F. for four hours in cordierite trays in a pre-heated furnace. This material was crushed, pulverized, and then wet ball milled at 46% solids. The final product was a low viscosity slurry with 90%<2 um by laser scattering.

The NuSurf™ mullite in this example was prepared to assure the formation of high pore volume aggregates with a house of cards structure. NuSurf™ delaminated hydrous pigment was slurried with water and dispersant, spray dried into densely packed microspheres, and subsequently pulverized to obtain a low density powder. This hydrous powder was calcined at 2350° F. in cordierite trays for four hours to form well-crystallized mullite. The product was crushed and pulverized to a powder, then made down at 50% solids using 4 ml C211 per kg of calcined kaolin using a Cowles mixer. This slurry was initially very dilatant and difficult to make down. Mixing was continued until the dilatancy was no longer apparent. The particle size by laser scattering was 90%<14.75 um.

Each of the four component slurries was maintained in suspension by rolling in sealed jugs until required for blending.

The slurry for spray drying was formed by mixing the four component slurries in the 30:20:20:30 ratio on a 3.93 kg overall dry basis as noted above in a Cowles mixer. Directly to this slurry 2.11 kg of N-brand® Sodium Silicate was added to form a mixture at 48% solids, which was sufficiently fluid to pump and spray dry. The material was spray dried using a 0.6 mm single fluid nozzle at 700 psi.

The as-sprayed material had a 0.72 gm/ml ABD and analyzed with 4.01% $Na_2O$, or 13.5% $SiO_2$ binder. This product was acid-neutralized by feeding the as spray dried microspheres to a bucket of cool stirred tap water, while co-feeding sufficient 40 Wt. % $H_2SO_4$ to keep the pH of the slurry between about 2.5 and 4. After all of the solids were added, the pH was monitored and controlled for 10 minutes before filtering and washing with about 2 gallons of tap water per Kg of microspheres, and then dried overnight at about 350° F.

The acid-neutralized microspheres were calcined directly at 1500° F. in pre-heated furnace using open cordierite trays during three hours. The product had 0.402 cc/gm pore volume in the 40–20,000 range by mercury porosimetry, a 77 um APS and 14.4 wt. % acid-solubles and a 0.66 gm/cc ABD.

EXAMPLE 3

A microsphere of exceptionally high pore volume and with unusually wide macropores was prepared with 30 parts of MK and 70 parts of NuSurf™ mullite aggregates; the latter prepared by pulverizing before calcining beyond 1,050° C. The calcined kaolin mixture was spray dried with 15 parts of SiO2 added from N-brand® sodium silicate. This microsphere was acid-neutralized.

The MK source was the same batch of Metamax™ made down in Example 2. The NuSurf™ mullite (aggregates) was also the same batch made down for Example 2. The two slurries were kept in suspension by rolling in sealed jugs until needed for blending.

The slurry for spray drying was formed by mixing the two component slurries in the 30:70 ratio on a 4.00 kg overall dry basis as noted above in a Cowles mixer. To this slurry 2.14 kg of N-brand® Sodium Silicate was added to form a mixture at 48% solids, which was sufficiently fluid to pump and spray dry. The material was spray dried using a 0.6 mm single fluid nozzle at 700 psi.

The as-sprayed material had a 0.56 gm/ml ABD and analyzed with 3.92% $Na_2O$, or 13.1% $SiO_2$ binder. This product was acid-neutralized and dried as per the procedure of Example 2. The acid-neutralized microspheres were calcined directly at 1500° F. in pre-heated furnace using open cordierite trays during three hours. The product had 0.407 cc/gm pore volume in the 40–20,000 Å diameter range and an additional 0.156 cc/gm in the 20,000 to 40,000 Å diameter range by mercury porosimetry, a 86 um APS and 10.6 wt. % acid-solubles with a 0.53 gm/cc ABD.

EXAMPLES 4–6

The microspheres of Examples 1–3 were crystallized during 23 hours to form zeolite Y by conventional procedures (U.S. Pat. Nos. 4,493,902, and 5,395,809) with the following results. The seeds are described by U.S. Pat. No. 4,631,262.

TABLE 1

| | Crystallization | | |
|---|---|---|---|
| | Example 4 | Example 5 | Example 6 |
| | Microsphere of | | |
| | Example 1 | Example 2 | Example 3 |
| Crystallization Recipe | | | |
| Grams MS | 245.0 | 225.0 | 230.0 |
| Seeds, grams | 171.9 | 157.9 | 161.4 |
| N-BRAND, grams | 403.0 | 414.4 | 415.0 |
| 50% NaOH, grams | 66.8 | 90.6 | 87.6 |
| $H_2O$, grams | 462.0 | 435.9 | 429.6 |
| Sodium-form properties | | | |
| UCS, A | 24.62 | 24.62 | 24.63 |
| BET, m2/gm | 446 | 447 | 420 |
| MSA, m2/gm | 66 | 69 | 54 |
| ZSA, m2/gm | 380 | 379 | 366 |
| Hg TPV, 40–20K, cc/gm | 0.283 | 0.328 | 0.508 |
| Roller, wt. %/hr | 26 | 36 | 128 |

The mercury pore volume of these materials is considerably higher than provided for by the prior art of in situ crystallization. The sodium-form catalysts were then ion-exchanged to finished products as follows. Sodium-form catalyst was added to 27 wt. % ammonium nitrate solution at 180° F. and pH of 2.8–3.2 while stirring and adding 50% $HNO_3$ drop-wise to control pH. After all of the catalyst was added, the slurry was stirred for 15 minutes, filtered, and the cake washed with twice the dry catalyst weight of de-ionized water. Two such exchanges were done where the weight ratio of catalyst to 27 wt. % ammonium nitrate was 1:2. The samples were then rare earth exchanged at 180° F. and pH of 4 to yield about 3% REO on the catalyst. The $Na_2O$ content at this point was 1.8 to 1.9 Wt., considerably lower than prior art formulations.

The partially-exchanged materials were dried and then calcined at 1150° F. in pre-heated furnaces for two hours in covered silica trays while initially containing 25 Wt. % moisture. After calcination, the ammonium exchange procedure was repeated either five (Example 4) or three (Examples 5, 6) times, then calcined again at 25% moisture and 1150° F. to form the finished product. The results are as follows:

TABLE 2

| | Example 4 | Example 5 | Example 6 |
|---|---|---|---|
| UCS, Å | 24.52 | 24.51 | 24.48 |
| Roller, Wt %/hr | 20 | 47 | |
| ABD VF, gm/cc | 0.600 | 0.569 | 0.463 |
| Hg Pore Volume by Diameters (Å) | | | |
| 40–200 Å | 0.076 | 0.090 | 0.069 |
| 200–2000 Å | 0.186 | 0.166 | 0.125 |
| 2000–20,000 Å | 0.068 | 0.098 | 0.317 |
| 40–20,000 Å | 0.329 | 0.353 | 0.511 |
| BET, m2/gm | 383 | 361 | 299 |
| MSA, m2/gm | 71 | 76 | 57 |
| ZSA, m2/gm | 312 | 285 | 242 |
| $Al_2O_3$, Wt. % | 41.8 | 43.8 | 43.5 |
| $SiO_2$, Wt. % | 52.8 | 50.8 | 51.2 |
| $Na_2O$, Wt. % | 0.1 | 0.1 | 0.21 |
| $Fe_2O_3$, Wt. % | 0.54 | 0.47 | 0.4 |
| $TiO_2$, Wt. % | 0.85 | 0.83 | 0.79 |
| $P_2O_5$, ppm | 400 | 300 | 300 |
| REO, Wt. % | 2.92 | 2.41 | 2.58 |

It can be seen that the use of increasing amounts of properly pre-pulverized hydrous delaminated kaolin leads to more catalyst pore volume and wider macropores. An SEM image of the catalyst of Example 6 is shown in FIG. 1. The dark areas are the macropores which are clearly formed by the random or "house of cards" configuration of the sheets of matrix derived from delaminated pigment. The smaller granules sandwiched between the larger crystals of zeolite have been positively identified as mullite crystals. The larger crystals coated or otherwise lining the mullite matrix have been positively identified as zeolite Y.

Figure 2:
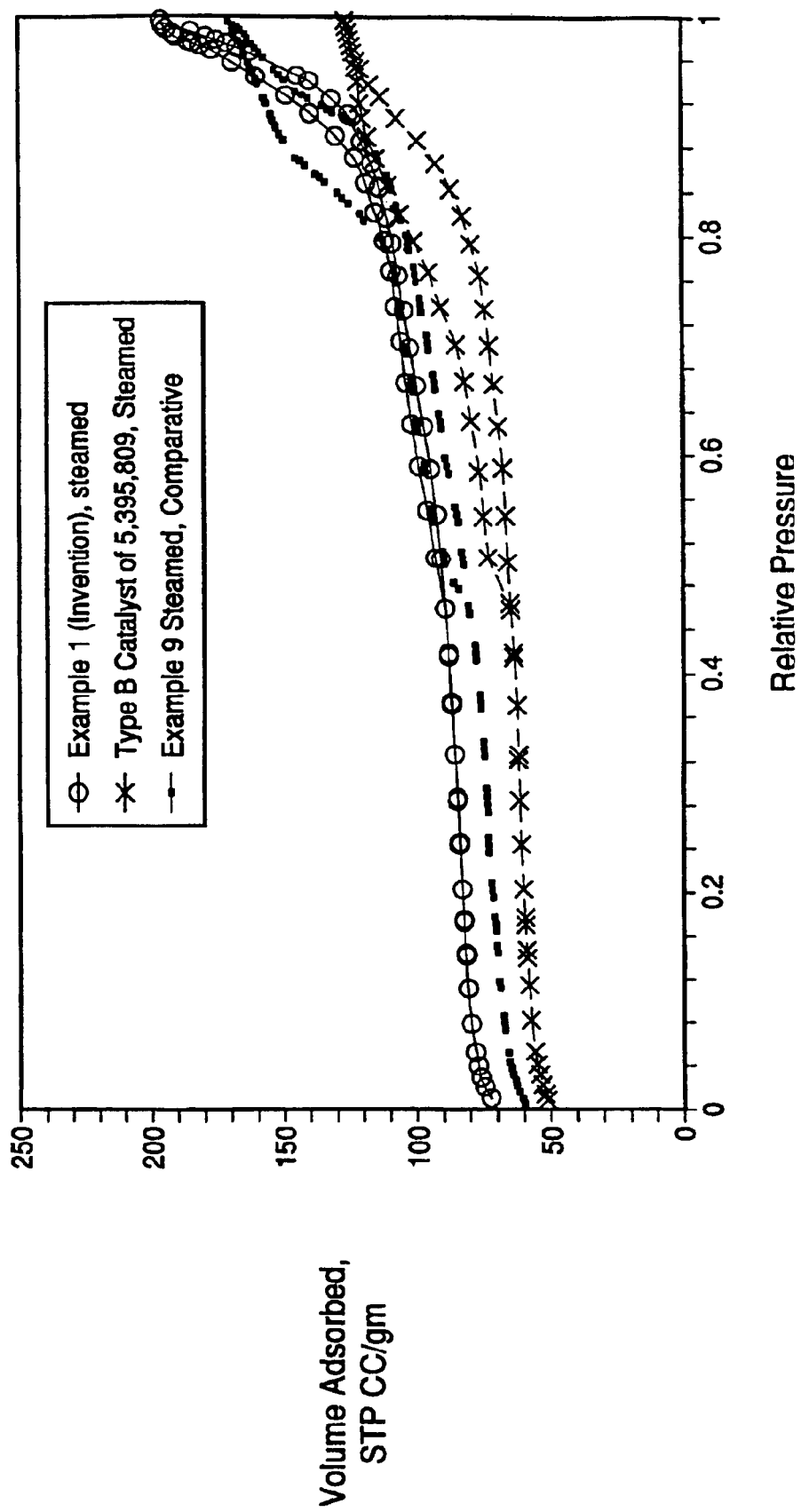
FIG. 2 is a graph showing the nitrogen hysteresis loops of the inventive catalyst and comparative catalyst.

Inclusion of both mullite and spinel leads to a tri-modal pore size distribution. The porosity intrinsic to the spinel and mullite phases are visible in the mercury pore size data, indicating that these mesoporous matrices are not occluded by the zeolite which grows upon them. This is confirmed by the reduced volume within the nitrogen hysteresis loops (FIG. 2) obtained for finished product catalysts that were steamed at 1500° F. in 100% steam for four hours. Two comparative Examples are shown from U.S. Pat. No. 5,395,809.

EXAMPLE 7

This example describes the use of blends of coarse and fine matrix kaolins useful for lower surface area formulations which retain wide macropores and excellent catalytic performance.

A series of short test runs to convert kaolins to mullite and silica were conducted on a production-scale rotary calciner that was direct-fired with natural gas. In one case booklet-type kaolins (NOKARB™) calcined to form the matrix for the FCC catalysts described by U.S. Pat. Nos. 4,493,902 and 5,395,809 were being produced, and at the end of the campaign the calciner severity was raised to maximize the yield of mullite. A product was collected for pilot spray drying work. Later, Ansilex 93™ (A93) pigment was to be made. A93 is made from gray clay having 90% finer than 1 um by sedimentation. The fractionated hydrous kaolin has been spray dried and then pulverized to a low density powder. Just before the A93 production run the calciner severity was increased to raise the mullite content of the initial product to the maximum extent possible, and a sample was taken of this product ("M93"). Much later it was determined that this material was in fact derived from a mixture of booklet clays and the ultrafine hydrous kaolins. The exact proportions of the mixture could not be determined, but Fe2O3, SEM and water pore volume results confirmed that intermixing had indeed occurred. The M93 was about 58% converted to fully crystallized mullite by X-ray diffraction.

A microsphere was made from the M93 mixed calcined kaolin product by diluting 33.3 parts (dry basis) of LHT hydrous pigment slurry with water in a Cowles mixer and then adding 66.7 parts of dry M93 in a batch process, along with sufficient dispersant to make a fluid mixture. The mixture contained 50% solids but exhibited some residual dilatancy. The slurry was fed to a spray dryer with a wheel atomizer having a single row of circular openings. 4.1 parts (as $SiO_2$) of sodium silicate binder solution having a 2.88 $SiO_2/Na_2O$ were injected into the slurry at the entrance of an in line static mixer placed just upstream of the atomizer.

The microspheres were calcined to convert the hydrous kaolin to metakaolin but without reaching the characteristic exotherm. The $Na_2O$ content was 1.40 wt. %, the acid solubles were 14.72 wt. %, the APS was 91 um, the ABD 0.6 gm/cc, and the Hg pore volume between 40 and 20,000 Å diameter was 0.520 gm/cc.

EXAMPLE 8

The microspheres of Example 7 were crystallized during 22 hours to form zeolite Y by conventional procedures (U.S. Pat. Nos. 4,493,902; 5,395,809) with the results as shown in Table 3.

TABLE 3

| Crystallization Microsphere | Example 8 Example 7 |
|---|---|
| Crystallization recipe | |
| Grams MS | 170.0 |
| Seeds, grams | 109.7 |
| N-BRAND grams | 398.3 |
| 50% NaOH, grams | 76.5 |
| H2O grams | 418.3 |
| Reaction product properties | |
| UCS, A | 24.62 |
| BET, m2/gm | 464 |
| MSA, m2/gm | 82 |
| ZSA, m2/gm | 382 |
| Roller, Wt. %/hr | 12 |

The sodium-form catalyst was ion exchanged to 1.75 wt. % Na$_2$O and 3.14 wt. % REO as above, calcined as above and then ammonium exchanged as above to 0.23 wt. % Na$_2$O, then calcined as prescribed above to obtain the finished product. The finished product was steamed at 1500° F. in 1 atm of steam in an open quartz tube for four hours. The properties were as found in Table 4.

EXAMPLE 9

This is a comparative example. A commercially-prepared catalyst made substantially by the methods of U.S. Pat. No. 5,395,809 were obtained, analyzed and tested.

EXAMPLE 10

This is a comparative example. A sample of FCC catalyst by the name of "GDO" was analyzed and tested. The method of manufacture is not specifically known, however it is presumed that this is representative of the state of the art for incorporated catalysts made with an aluminum chlorohydrol binder and formulated with additional granular alumina for bottoms cracking.

TABLE 4

| | Example 8 | Example 9 | Example 10 |
|---|---|---|---|
| UCS, Å | 24.47 | 24.53 | 24.57 |
| Roller, Wt %/hr | 14 | 5 | |
| ABD VF, gm/cc | 0.59 | 0.75 | 0.70 |
| 40–100 Å Hg PV | 0.061 | 0.074 | 0.061 |
| 100–600 Å, Hg PV | 0.139 | 0.024 | 0.073 |
| 600–20,000 Å, Hg PV | 0.168 | 0.030 | 0.067 |
| 40–20,000 Å, Hg PV | 0.368 | 0.129 | 0.201 |
| BET, m2/gm | 377 | 402 | 222 |
| MSA, m2/gm | 90 | 108 | 85 |
| ZSA, m2/gm | 287 | 294 | 137 |
| Al$_2$O$_3$, Wt. % | 40.30 | 31.9 | 50.7 |
| SiO$_2$, Wt. % | 53.70 | 61.5 | 44.7 |
| Na$_2$O, Wt. % | 0.23 | 0.28 | 0.14 |
| Fe$_2$O$_3$, Wt. % | 0.69 | 0.27 | 0.62 |
| TiO$_2$, Wt. % | 1.46 | 1.25 | 0.87 |
| P$_2$O$_5$ | 0.03 | .08 | 0.1 |
| REO, Wt. % | 2.85 | 3.00 | 1.96 |

TABLE 4-continued

| | Example 8 | Example 9 | Example 10 |
|---|---|---|---|
| Properties after Steaming 1500 F., four hours in 100% steam | | | |
| BET, m2/gm | 249 | 241 | 133 |
| MSA, m2/gm | 73.4 | 76 | 50 |
| ZSA, m2/gm | 175.6 | 165 | 83 |
| UCS, A | 24.34 | 24.33 | 24.29 |

EXAMPLES 11–12

Catalytic performance was determined using an ACE™ microscale fixed fluidized bed unit operating at a superficial 8 WHSV and 980° F. using 9 grams of catalyst and a gas oil A feed (Table 5), substantially as described in U.S. Pat. No. 6,069,012, with the 2.125" injector position. The patent suggests this injector position corresponds to a 2–2.5 sec riser residence time. The catalyst strip time was held constant at 575 sec. The catalysts of Examples 8 and 9 were diluted with activity-adjusting microspheres as disclosed by Brown in the '902 patent. However, in order to remain faithful to the teachings of U.S. Pat. No. 6,069,012 and conventional reaction engineering, it is clear that different catalysts should be evaluated at constant bed volume. This ensures that vapor residence time is constant in the comparisons. In an effort to do this, these catalyst formulations were blended to equal ABD and tested at constant weight. This is done by using appropriate amounts of the activity-adjusting microspheres cited by Brown (ca. 0.98 ABD), and the microspheres of Example 3 (0.53 ABD).

The ABD of comparative catalysts such as Example 10 could not be adjusted. This catalyst was therefore tested at both 9 grams of charge (low catalyst volume) and at about 11 grams of charge (equal catalyst volume). In order to maintain constant hydrodynamics, the superficial WHSV in the latter case was adjusted to 6.6 to give the same oil delivery rate (gms/min). Coke, LCO and gasoline selectivities were more favorable for the comparative example at the latter condition, and so these results are reported in Table 6.

TABLE 5

| | Gas oil properties | |
|---|---|---|
| | Feed | |
| | A | B |
| IBP (° F.) | 462 | 355 |
| 5% | 586 | 564 |
| 50% | 808 | 826 |
| 95% | 1018 | 1085 |
| FBP (° F.) | 1112 | 1248 |
| Concarbon | 0.36 | 0.79 |
| API @ 60° | 24.29 | 24.48 |
| Pour Point (° F.) | 97 | 100 |
| Aniline Pt. (° F.) | 189 | 194 |
| Basic N ppm | 355 | 282 |
| Total N ppm | 986 | 1018 |
| Ref. Index @ 25° C. | 1.5045 | 1.5061 |
| Sulfur, % | 0.72 | 0.48 |
| UOP Kw | 11.92 | |

As is known from commercial experience, the comparative Example 9 has very favorable selectivity in short contact time cracking, even when compared to catalysts with substantially higher pore volume. Because both Example 9 and the catalyst of '902 also have substantially higher surface area than conventional catalysts, it had previously and reasonably been concluded that transport phenomena are not limiting in FCC catalyst performance. The present results show the surprising improvement in selectivity over the prior art of Example 9, already a leading technology, and the further surprising advantage over a high pore volume catalyst which has much lower surface area. Conventional thinking would lead one to believe that if transport was indeed generally limiting, Example 10 would perform the best, which is not the case. The deficit of the catalyst of Example 10 in bottoms upgrading is particularly surprising in light of the lower steamed ZSA/MSA ratio and higher alumina content of that catalyst vs. the catalysts of the invention.

Primary cracking product selectivities have been improved using the catalysts of the invention. These catalysts show the unusual and desirable traits of higher gasoline selectivity at constant steamed unit cell size, often with higher olefinicity. Higher LCO selectivity at constant conversion is observed simultaneously with lower coke selectivity. Prior to the catalysts of the invention, such performance characteristics normally had to be traded off one against another.

TABLE 6

Selectivities correlated to constant 75 Wt. % Conversion

|  | Example 8 | Example 9 | Example 10 at 11 grams charge |
|---|---|---|---|
| Blend BET | 140 | 150 | 133 |
| H₂, wt. % | 0.08 | 0.07 | 0.10 |
| Total C2 - | 1.47 | 1.70 | 1.81 |
| LPG | 17.49 | 19.43 | 19.90 |
| Gasoline | 53.35 | 50.91 | 50.16 |
| LCO | 16.98 | 16.51 | 16.70 |
| HCO | 8.02 | 8.49 | 8.30 |
| Coke | 2.69 | 2.96 | 3.13 |
| C3=/Total C3 | 0.87 | 0.85 | 0.82 |
| C4=/Total C4 | 0.54 | 0.51 | 0.48 |
| Conversion at 2.96% Coke | 75.64 | 75.00 | 74.63 |

EXAMPLE 11

A fractionated (90%<1 um by sedimentation) hydrous kaolin slurry derived from a gray clay deposit was spray dried and pulverized as disclosed in U.S. Pat. No. 3,586,523. The material was then calcined at higher severity so as to convert it 50% to 80% of the way to well-crystallized mullite, as measured by X-ray diffraction line intensities relative to a kaolin which had been fully converted as in the '902 patent, Example 4. Typical properties of this material, also designated M93, are listed in Table 7, along with comparative materials.

The preferred calcined kaolins used as FCC catalyst matrix precursors have ISP percent solids below about 57%, more preferably, below 55% solids, and most preferably in the range of 48–52% solids. This is to say, having higher water pore volumes than precursors used in the prior art. The laser particle size we prefer is 90% less than about 10 um, so that suitable microspheres can be formed. The simplest test for acceptability is the tamped bulk density, and this should be less than about 0.45 gm/cc, more preferably less than 0.40 gm/cc. Tamped bulk density, loose bulk density, mercury volume and ISP solids all correlate with each other.

The kaolin-based materials may have any value of mullite index so long as they meet the previous requirements, but they must have passed substantially through the exotherm in order to yield residual mesoporous or microporous matrix. The resulting matrix surface area and modal pore diameter varies smoothly as the relative mullite crystallite size is varied.

TABLE 7

Typical properties of calcined products

| | | Property | | |
|---|---|---|---|---|
| Units | ISP % solids | Laser scattering Particle size 90% <, um | Hg pore volume, 40–20,000 Å Diameter cc/gm | Tamped bulk Density Gm/cc |
| M93, Example 11 | 48–52% | 9 to 10 um | 1.4 to 1.5 | 0.38 |
| M93, Example 7 | 55% | 7.89 um | 1.13 | 0.45 |
| A93 spinel | 48–52% | 5 to 7 um | 1.45 | 0.3 |
| Satintone 1 | 58% | | | 0.48 |
| Spinel from NOKARB ®, Example 8 | 66% | 19 um | 0.73 | 0.69 |
| Mullite from Satintone 2, '902 Example 4 process | 58.76% | 10.66 um | 0.93 | 0.55 |
| Mullite from A93, '902 process: 2200° F. for 7 hours | 51.38% | 9.66 | 1.159 | 0.53 |
| CE Minerals Mullite | 77% | 117 | Nonporous | 1.66 |

The M93 of the present example along with C211 dispersant was added on a continuous basis to a dispersed slurry of LHT pigment in water using a staged Cowles system. The addition rates were controlled such that the blended slurry contained 33 parts of LHT hydrous pigment to 67 parts of M93 calcined matrix precursor at 48 to 50% solids. The mixture was then spray dried to form microspheres. Additional water was added as needed to control dilatancy and improve atomization. The slurry was fed to a spray dryer with a wheel atomizer. 4 parts (as SiO2) of sodium silicate binder solution having a 2.88 SiO2/Na2O were injected into the slurry at the entrance of an in line static mixer placed just upstream of the atomizer. The resulting microspheres were calcined in a direct-fired rotary calciner to convert the hydrous kaolin in the mixture to metakaolin but without reaching the characteristic exotherm.

The Na₂O content was 1.73 wt. %, the acid solubles were 16.23 wt. %, the APS was 82 um, the ABD 0.47 gm/cc, and the Hg pore volume between 40 and 20,000 Å diameter was 0.679 gm/cc.

The microspheres were crystallized in plant-scale reactors using about 950 gallons of seeds, 8,612 gals 30 wt. % recycled and concentrated sodium di-silicate, 600 gallons of 19% NaOH, 938 gals of water, 23,897 lbs of the above microspheres, and an additional 3,259 lbs of metakaolin microspheres, these latter microspheres prepared substantially as described by U.S. Pat. No. 3,647,718. The amount of the metakaolin microsphere was chosen to control the porosity and roller attrition of the finished product tightly to specification. The residuals of this second microsphere are believed to have been largely removed by centrifugal separation devices.

The product of the crystallizations were filtered, washed to remove excess mother liquor, ion exchanged to about 2.5% $Na_2O$ and 3% REO, calcined in rotary calciners to migrate the sodium but not substantially reduce unit cell size, ammonium exchanged again to about 0.2% $Na_2O$, then calcined again to reduce the zeolite unit cell size. These catalyst work-up processes are previously known and merely adopted without modification for the present work.

EXAMPLE 12

The catalyst of Example 11 was provided to an FCC unit following the use of a conventional FCC catalyst. The unit was equipped with modern feed nozzles and riser termination devices and had a riser contact time of 2.0 to 2.5 seconds. After introduction of the catalyst of Example 11, the conversion of the unit was observed to increase by 3 LV %, at constant coke. Gasoline yield was increased concurrently with increased light olefins, and most significantly, bottoms API gravity was reduced to levels not previously observed. The improvement in bottoms cracking was remarkable since it came without a penalty in dry gas yield or delta coke.

Figure 3:
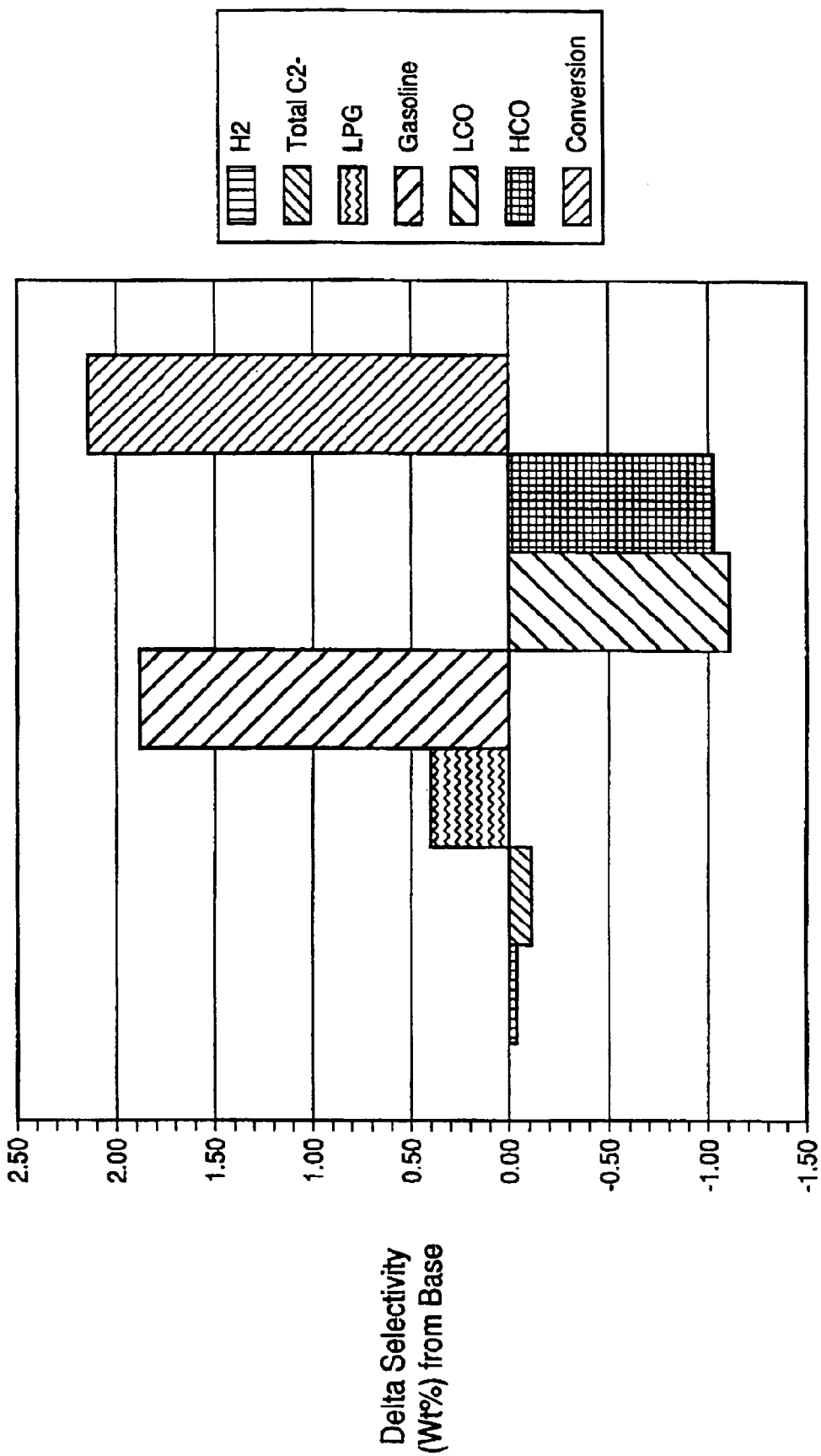
FIG. 3 is a graph of yield deltas found with an inventive catalyst relative to a conventional catalyst.
Figure 4:
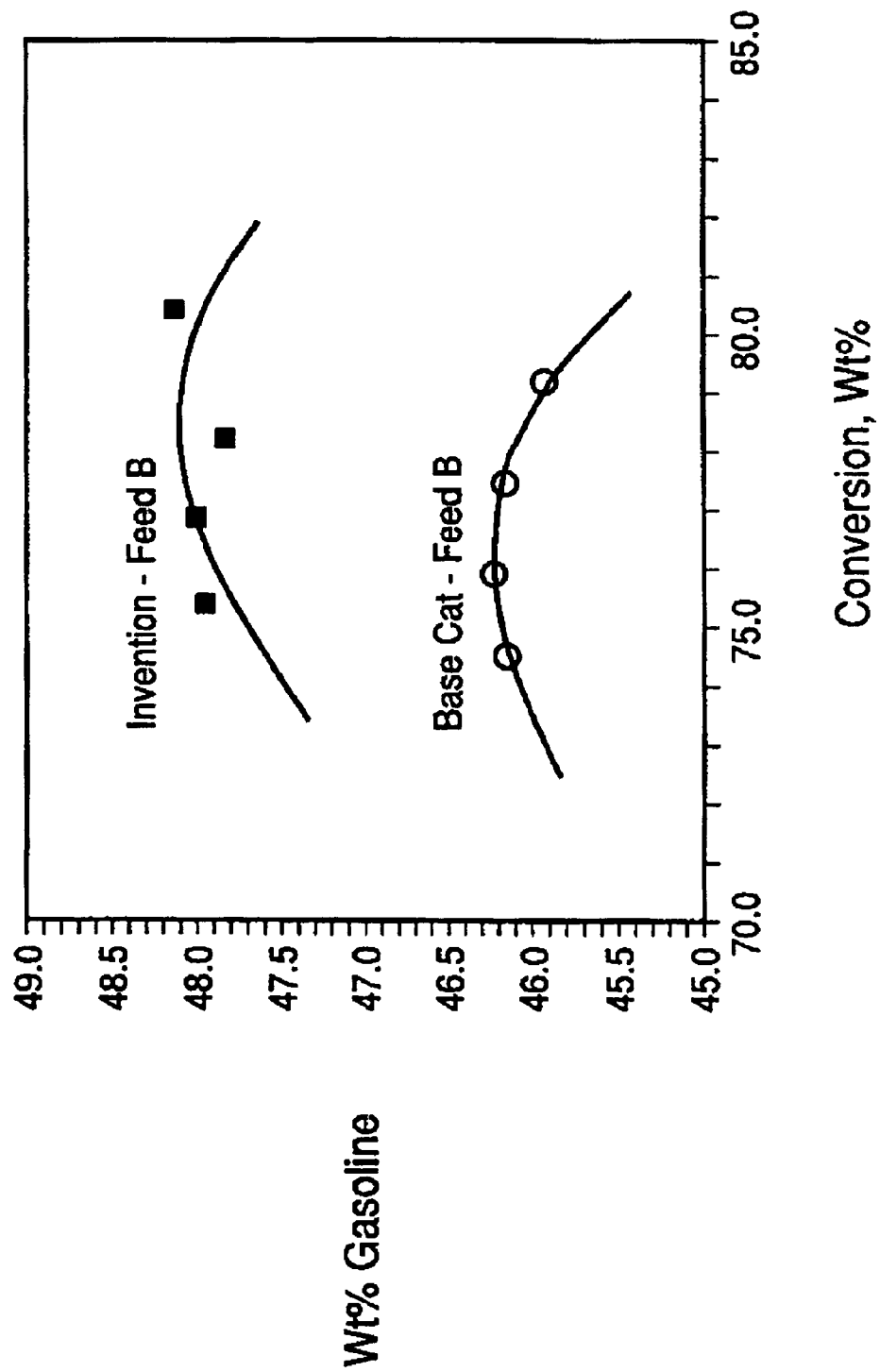
FIG. 4 illustrates the gasoline yields from the tests shown in FIG. 3.

Because the fixed fluid bed used was relatively new and had not been publicly calibrated, a post-audit of the ACE™ technique was conducted using the equilibrium catalysts from before and after the trial. The properties of the equilibrium catalysts are listed in Table 8. The ACE™ was run as before, using the 2.125" injector position and feed obtained during the trial. The catalytic results are listed in Table 9 and presented in FIG. 3 in the form of yield deltas against the conventional catalyst on feed B calculated at constant coke. The results from the fixed fluid bed unit substantially reproduce the deltas from the FCC unit with reasonable accuracy.

TABLE 8

Equilibrium Catalyst Properties

| Sample | | Example 12 Comparative | Example 12 Invention |
|---|---|---|---|
| Conversion | wt. % | 72.6 | 72 |
| APS | μ | 75.2 | 72 |
| SA | m²/g | 181.4 | 172 |
| MSA | m²/g | 63.4 | 55 |
| ABD | g/cc | 0.896 | 0.83 |
| Cu | Ppm | 10.4 | 18 |
| Ni | Ppm | 516.2 | 623 |
| V | Ppm | 1877.2 | 1535 |
| Fe | wt % | 0.31 | 0.42 |
| Na | wt % | 0.376 | 0.25 |
| C | wt % | 0.06 | 0.08 |
| $Al_2O_3$ | wt % | 33.98 | 37.5 |
| Ti | wt % | 0.784 | 0.75 |
| C12 PV | CC/G | 0.31 | 0.36 |
| P | wt % | 0.3 | 0.27 |
| ReO | wt % | 2.03 | 2.44 |
| Sb | Ppm | 103 | 5 |
| UCS | Å | 24.29 | 24.29 |
| Ecat | Z/M | 1.86 | 2.13 |
| Hg Pore Volume | 40–100 A | 0.057 | 0.040 |
| Hg Pore Volume | 100–600 A | 0.107 | 0.146 |
| Hg Pore Volume | 600–20K A | 0.067 | 0.123 |
| Hg Pore Volume | 40–20K TPV | 0.231 | 0.309 |

TABLE 9

Selectivities Correlated to Constant 5% Coke

| | Base Cat - Feed B | Invention - Feed B |
|---|---|---|
| Conversion | 76.37 | 78.51 |
| $H_2$ | 0.27 | 0.23 |
| Total C2 - | 2.68 | 2.55 |
| C3=/Total C3s | 0.84 | 0.85 |
| C4=/Total C4s | 0.53 | 0.53 |
| LPG | 22.45 | 22.84 |
| Gasoline | 46.24 | 48.12 |
| LCO | 17.94 | 16.82 |
| HCO | 5.70 | 4.67 |
| Coke | 5.00 | 5.00 |
| Total | 100.00 | 100.00 |

EXAMPLE 13

The porous microspheres of Example 12 required excessive amounts of the second metakaolin microsphere to control attrition and porosity to specification. The green strength of the microspheres has also led to abrasion problems. These microspheres are therefore improved by increasing hydrous kaolin (to reduce the addition of the second microsphere) and binder (to improve green strength). Microspheres are prepared with about 37 to 40% hydrous kaolin and 63% to 60% M93 prepared as described in Example 12. About 8% binder as silica is added by injection and the microspheres are calcined to convert hydrous kaolin to metakaolin. Green strength is improved in both cases. Crystallization of the microspheres at varying doses of the second metakaolin microsphere shows that the same or lower dose of the second microsphere leads to acceptable properties for the catalyst of the invention.

EXAMPLE 14

65 VF (volatile free) parts of high pore volume aluminum oxide/swellable clay composite are prepared according to U.S. Pat. No. 6,451,200 and are optionally calcined according to that disclosure. This aluminum composite is combined with 35 parts of ultra fine hydrated kaolin and 25 parts of acid alum-stabilized silica sol to form a flocculated kaolin-alumina slurry, and spray dried to form microspheres. The use of the flocculated ultra fine hydrous kaolin maximizes macroporosity, and limiting the amount of hydrous kaolin constrains the limiting reagent alumina and corresponding zeolite yield. The microspheres are washed and exchanged to remove salts, calcined to convert the ultra fine kaolin to metakaolin and the aluminum oxide/swellable clay to transition alumina, and crystallized to form zeolite Y. The theoretical yield is on the order of 55–65% NaY.

EXAMPLE 15

Example 14 is repeated, but the aluminum oxide/clay is prepared with a platelet form of gibbsite having an aspect ratio over 1.0. The platelet morphology is preserved upon rehydration and calcination. Deagglomeration by wet milling or hammer milling of the platelets is optionally practiced before or after rehydration or calcination, and these platelets are reagglomerated in a house of cards morphology to maximize macroporosity, either in a pulverize-calcine-pulverize process as disclosed above, or by floccing or gelling a slurry of these materials, as is well known in the art. This more macroporous precursor yields a higher pore volume microsphere.

EXAMPLE 16

Sodium aluminate and aluminum sulfate solutions, optionally including or substituting sodium silicate solution, are combined in precipitation and aging steps as has been instructed in the art. A high viscosity low solids high pore volume cogel is formed. This cogel is filtered and washed, optionally wet media milled to 90% less than about 15 um, and spray dried with 5–15% colloidal or other binder, optionally washed again, and calcined to form Si—Al spinels, mullite, and amorphous Si—Al oxides. Si-free transition aluminas and alpha alumina may also be present, depending on the degree of mixing of the solutions, as is known. Calcination should be sufficient to achieve full conversion to the SiAl spinels, and this may be accompanied by an exotherm in DTA. Hypotheses are taken as to the percentages of the total $SiO_2$ and $Al_2O_3$ in the gross composition active for zeolite synthesis. Crystallizations are made based on these hypotheses at stoichiometric ratios known in the art to crystallize faujasite. The experimental crystallization or interpolation between these which best match the observed results for zeolite yield represents the correct fraction of active species. These may relate back well to the relative Si—Al spinel and mullite contents versus amorphous components, but these are not easily determined analytically. If excessive pore volume is found in the crystallized product, more extensive milling to deagglomerate the precursor gel or mulling to compress macroporosity in the precursor gel will reduce porosity in subsequent attempts. If insufficient zeolite is formed, metakaolin microspheres or powder may be added to the crystallization to provide more reactive alumina and boost zeolite yield. Alternatively, kaolin can be added to the gel or microsphere spray drying formulation. Excessive zeolite may also result from too much Al being in the amorphous phase. In this case, more of the aluminum in the precipitation should be induced to combine into alumina-rich gel, instead of dispersed into $SiO_2$ gel. This will yield transition aluminas, Si—Al spinel and mullite instead of amorphous products that contribute to the growth of NaY.

EXAMPLE 17

This example illustrates the preparation of a catalyst that contains a macroporous matrix formed of foamed alumina.

Preparation of the Foamed Alumina Host material:

1152 g of Catapal® pseudoboehmite was placed in the bowl of a General™ Mixer. 1188 g of a 1.5% solution of Methocel® in water was prepared, and to this was added 72 g of acetic acid. The combined solutions were added slowly with mixing to the Catapal® alumina, and this was subsequently mixed at high speed for 20 minutes. Employing 150 g more of water, the mixture was then transferred to a Denver mixer, and mixed at high speed for another 15 minutes. 840 g of additional 1.5% Methocel® solution, 10 g of acetic acid, and 150 ml of water were then added, and mixing was continued for another 10 minutes. The material was then removed from the mixer and 600 g of Cabot Foamed Alumina was slowly added and mixed in by hand, together with water sufficient to keep the mixture soupy. No high or low shear mechanical mixing was done. The boehmite-foamed alumina mixture was then dried as a cake, and calcined at 500° C. for 3 hours. The calcined cake was then reduced to FCC particle size by milling with a Jaw Crusher and grinder, with the −40/+230 mesh size screened fraction being retained. The mercury total pore volume was 0.96 cc/g.

Crystallization of Zeolite Y in the Foamed Alumina Host:

To a 1 liter resin kettle was added 480 parts deionized water, 220 parts of 44 wt % sodium disilicate solution, 56 parts initiator (seeds) (nominally 0.5% Al2O3 in sodium silicate), 80 parts foamed alumina formed as above, and 19 parts silica gel. The reactor was then assembled with agitator, reflux condenser and thermocouple and heated to 205° F. over a period of 30 minutes. When temperature was reached, 34.3 parts of metakaolin microspheres were added and the temperature was maintained at 205° F. for 16 to 20 hours, until the zeolite Y content of the separated solids reached a maximum by X-ray diffraction. The reaction mixture was then filtered, washed with two reaction mixture volumes of deionized water, then oven dried in air at 120° C. A portion of the dried product was retained, and the remainder was sieved on a 200 mesh screen into two fractions. Each was analyzed by X-ray diffraction.

The zeolite Y content (zeolite index, ZI) of the un-separated, dried reaction mixture was 38, the ZI of the <200 mesh fraction was 12 and the ZI of the foamed alumina (>200 mesh) fraction was 46. The color of the <200 mesh product was the same tan color as metakaolin. The color of the >200 mesh product was the same white as the gamma alumina host material, and while it occupied the same volume as before crystallization, its mass was increased for having zeolite grown inside the macropore structure of the host alumina. This confirmed that the metakaolin had been leached, depleting its mass and leading to its disintegration, and that the metakaolin aluminum had reprecipitated as zeolite in the macroporous host. Mercury porosimetry indicated a large peak centered at 300 Å radius with a range of 100–1000 Å radius.

Figure 5:
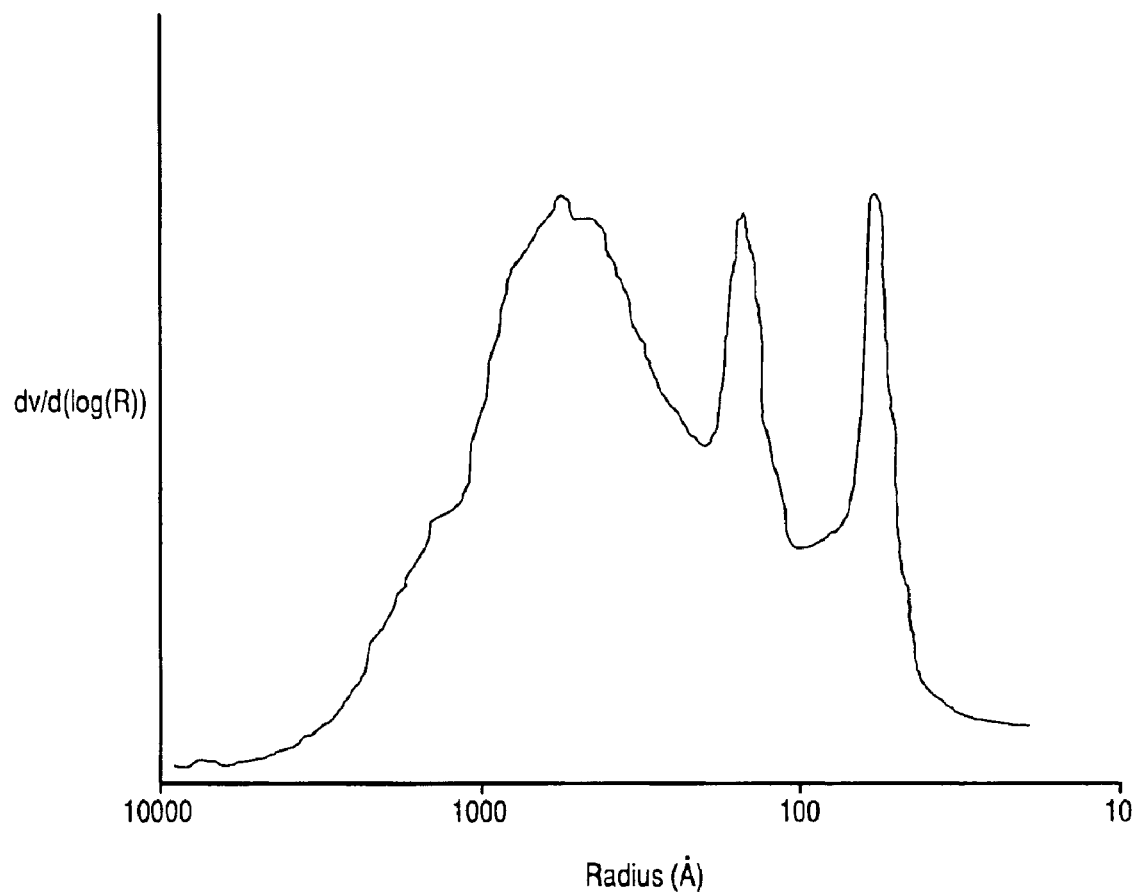
FIG. 5 is a graph showing the mercury pore size distribution for a catalyst containing a foamed alumina matrix.

The >200 mesh sodium-form reaction product was then ion-exchanged to remove sodium by treatment with ammonium nitrate solution. To 1 part sodium form catalyst by weight was added 1 part deionized water and 1 part of 54 weight % ammonium nitrate solution. The mixture was adjusted to pH=3 with 1:1 nitric acid and heated to 80° C. for 15 minutes. The slurry was then filtered and washed with 2 parts deionized water for each part of catalyst. This procedure was repeated for a total of two exchanges, after which the catalyst was dried at 120° C. The dried catalyst was then exchanged at 33% solids with a rare earth nitrate solution to load 1.7% total rare earth oxide on the catalyst. The mixture was heated to 205° F. and pH adjusted to 3.0 with 1:1 nitric acid and held at temperature for 30 minutes for this exchange. The slurry was then filtered and washed with 1 part of water to each part of dry catalyst exchanged. The catalyst was then dried at 120° C. The dried catalyst was then calcined in a covered silica tray with 1 part of water added to 4 parts of catalyst. The covered tray was placed in a 700° F. furnace for 2 hours, then removed and cooled. Water was again added to the catalyst, 1 part water to 4 parts catalyst, the covered tray was placed in a furnace at 1112° F. for 2 hours, then removed and cooled. The calcined catalyst was again ammonium exchanged as described above, for three additional exchanges, 1 part of water to 1 part catalyst and 1 part 54% ammonium nitrate, followed by washing with water. The fully exchanged and stabilized catalyst was dried at 120° C. Mercury porosimetry of the stabilized catalyst is shown in FIG. 5, with the major porosity (modality) at a radius of about 500 Å with a pore radius range of from 100–3000 Å. The total pore volume by mercury was 0.48 cc/g and 0.55 cc/g by nitrogen porosimetry. The zeolite micropore surface area was 177 $m^2/g$, the matrix surface area was 59 $m^2/g$, and the $Na_2O$ content was 0.05 wt %.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A zeolite FCC catalyst comprising zeolite crystals contained as a layer on the surface of a porous alumina-containing matrix, said zeolite-layered matrix arranged in a configuration to provide pores in which the zeolite layer is provided on the walls of the pores, said catalyst having a mercury porosity of greater than 0.27 cc/gm for pores of 40–20,000 Å diameter and a crystallized zeolite content of at least 40 wt %.

2. A zeolite FCC catalyst comprising zeolite crystals contained as a layer on the surface of a porous alumina-containing matrix derived essentially from an alumina source other than kaolin, said zeolite-layered matrix arranged in a configuration to provide pores in which the zeolite layer is provided on the walls of the pores, said catalyst having a mercury porosity of greater than 0.20 cc/gm for pores of 40–20,000 Å diameter.

3. The catalyst of claim 2, wherein said zeolite is zeolite Y.

4. The catalyst of claim 2 having a mercury porosity of greater than 0.27 cc/gm for pores of 40–20,000 Å diameter.

5. The catalyst of claim 2 having a mercury porosity of at least 0.30 cc/gm for pores of 40–20,000 Å diameter.

6. The catalyst of claim 2 wherein said zeolite is crystallized in-situ on the surface of said matrix.

7. The catalyst of claim 2, wherein said porous matrix contains a modal distribution of pores characterized as a peak at a diameter of at least 600 Å.

8. The catalyst of claim 2 which is substantially free of an added binder.

9. The catalyst of claim 7 having a mercury porosity of at least 0.07 cc/gm for pores of 600–20,000 Å diameter.

10. The catalyst of claim 4 having a mercury porosity of at least 0.07 cc/gm for pores of 600–20,000 Å diameter.

11. The catalyst of claim 2 having a mercury porosity of at least 0.10 cc/gm for pores of 600–20,000 Å diameter.

12. The catalyst of claim 2 having a BET surface area of less than 500 $m^2/g$.

13. The catalyst of claim 2 having a BET surface area of less than 475 $m^2/g$.

14. The catalyst of claim 2 having a BET surface area of between about 300–450 $m^2/g$.

15. The catalyst of claim 9 having a BET surface area of less than 500 $m^2/g$.

16. The catalyst of claim 10 having a BET surface area of less than 500 $m^2/g$.

17. The catalyst of claim 1, wherein said zeolite is zeolite Y.

18. The catalyst of claim 17 wherein said zeolite is crystallized in-situ on the surface of said matrix.

19. The catalyst of claim 1 which is substantially free of an added binder.

20. The catalyst of claim 2 wherein said alumina source is derived from aluminum trihydrates.

21. The catalyst of claim 20 wherein said aluminum trihydrates include bayerite or gibbsite.

22. The catalyst of claim 2 wherein said alumina source comprises transitional aluminas.

23. The catalyst of claim 2 wherein said alumina source comprises aluminum monohydrates.

24. The catalyst of claim 23 wherein said aluminum monohydrates include boehmite or pseudoboehmite.

25. The catalyst of claim 2 wherein said alumina source comprises foamed alumina.

26. The catalyst of claim 22 wherein said alumina source comprises bauxite.

27. The catalyst of claim 2 wherein said alumina source comprises silica-alumina cogels.

28. A fluid catalytic cracking catalyst comprising microspheres containing in-situ crystallized Y-faujasite, and having a mercury porosity of greater than about 0.20 cc/g for pores having diameters in the range of 40–20,000 Å, said microspheres comprising an alumina-matrix derived essentially from an alumina source other than kaolin.

29. The fluid catalytic cracking catalyst of claim 28, having a mercury porosity of at least about 0.27 cc/g for pores having diameters in the range of 40–20,000 Å.

30. The fluid catalytic cracking catalyst of claim 28 containing 0–12% by weight rare earth oxides.

31. The fluid catalytic cracking catalyst of claim 28 having a mercury porosity of at least 0.07 cc/gm for pores of 600–20,000 Å diameter.

32. The fluid catalytic cracking catalyst of claim 28 having a mercury porosity of at least 0.10 cc/gm for pores of 600–20,000 Å diameter.

33. The fluid catalytic cracking catalyst of claim 28 having a BET surface area of less than 500 $m^2/g$.

34. The fluid catalytic cracking catalyst of claim 28 having a BET surface area less than 475 $m^2/g$.

35. The fluid catalytic cracking catalyst of claim 28 having a BET surface area in the range of about 300–450 $m^2/g$.

36. The fluid catalytic cracking catalyst of claim 28 containing rare earth oxides in an amount of from about 0.5 to 12 wt. %.

37. The catalyst of claim 28 wherein said alumina source is derived from aluminum trihydrates.

38. The catalyst of claim 37 wherein said aluminum trihydrates include bayerite or gibbsite.

39. The catalyst of claim 28 wherein said alumina source comprises transitional aluminas.

40. The catalyst of claim 28 wherein said alumina source comprises aluminum monohydrates.

41. The catalyst of claim 40 wherein said aluminum monohydrates include boehmite or pseudoboehmite.

42. The catalyst of claim 28 wherein said alumina source comprises foamed alumina.

43. The catalyst of claim 28 wherein said alumina source comprises bauxite.

44. The catalyst of claim 28 wherein said alumina source comprises silica-alumina cogels.

45. A method of cracking a hydrocarbon feed under FCC conditions, comprising contacting said hydrocarbon feed with the catalyst of claim 1, 2 or 28.

46. The method of claim 45, wherein said hydrocarbon feed and catalyst are contacted for a time of no more than 3 seconds.

47. The method of claim 45, wherein said catalyst and said hydrocarbon feed are contacted for a time of no more than 1 second.

48. The method of claim 45, wherein said catalyst has a mercury porosity of at least 0.27 cc/g for pores of 40–20,000 Å diameter.

49. The method of claim 45, wherein said catalyst has a mercury porosity of at least 0.07 cc/gm for pores having a size of 600–20,000 Å in diameter.

50. The method of claim 45, wherein said catalyst has a mercury porosity of at least 0.10 cc/gm for pores having a size of 600–20,000 Å in diameter.

51. The method of claim 45, wherein said catalyst has a BET surface area of less than 500 $m^2/g$.

52. The method of claim 45, wherein said catalyst has a BET surface area of less than 475 $m^2/g$.

53. The method of claim 45, wherein said catalyst has a BET surface area of between 300–475 $m^2/g$.

54. The method of claim 46, wherein said catalyst comprises 0.5 to 8 wt. % REO.

* * * * *